(12) United States Patent
Kishikawa et al.

(10) Patent No.: US 11,636,196 B2
(45) Date of Patent: *Apr. 25, 2023

(54) MISUSE DETECTION METHOD, MISUSE DETECTION ELECTRONIC CONTROL UNIT, AND MISUSE DETECTION SYSTEM

(71) Applicant: PANASONIC INTELLECTUAL PROPERTY CORPORATION OF AMERICA, Torrance, CA (US)

(72) Inventors: Takeshi Kishikawa, Osaka (JP); Yoshihiro Ujiie, Osaka (JP); Manabu Maeda, Osaka (JP); Hideki Matsushima, Tokyo (JP); Hiroshi Amano, Osaka (JP); Toshihisa Nakano, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 292 days.

This patent is subject to a terminal disclaimer.

(21) Appl. No.: 17/122,659

(22) Filed: Dec. 15, 2020

(65) Prior Publication Data

US 2021/0133309 A1 May 6, 2021

Related U.S. Application Data

(63) Continuation of application No. 15/873,952, filed on Jan. 18, 2018, now Pat. No. 10,902,109, which is a (Continued)

(30) Foreign Application Priority Data

May 13, 2016 (JP) .............................. JP2016-097047

(51) Int. Cl.
*G06F 21/44* (2013.01)
*G06F 21/55* (2013.01)
(Continued)

(52) U.S. Cl.
CPC .......... *G06F 21/44* (2013.01); *B60R 16/0231* (2013.01); *G06F 13/4027* (2013.01);
(Continued)

(58) Field of Classification Search
CPC ....................................................... G06F 21/44
See application file for complete search history.

(56) References Cited

U.S. PATENT DOCUMENTS 7,841,008 B1 * 11/2010 Cole ...................... G06F 21/577
726/25
8,266,698 B1 * 9/2012 Seshardi ................. G06F 21/53
726/25
(Continued)

FOREIGN PATENT DOCUMENTS

EP 2797263 10/2014
WO 2013/094072 6/2013

OTHER PUBLICATIONS

International Search Report of PCT application No. PCT/JP2016/003567 dated Oct. 18, 2016.
(Continued)

*Primary Examiner* — Simon P Kanaan
(74) *Attorney, Agent, or Firm* — Greenblum & Bernstein, P.L.C.

(57) ABSTRACT

A misuse detection method used in an electronic control unit in a vehicle network system including multiple electronic control units that communicate with one another through networks. The misuse detection method includes receiving a target data frame at one time point, and receiving a reference data frame at another time point different than the one time point. The misuse detection method further includes performing, as misuse detection for the target data frame based on a certain rule specifying a reception interval between the one time point at which the target data frame is received and the other time point at which the reference data frame is
(Continued)

received, and determining the target data frame received is for misuse based on a length of the reception interval.

15 Claims, 14 Drawing Sheets

Related U.S. Application Data continuation of application No. PCT/JP2016/003567, filed on Aug. 3, 2016.

(60) Provisional application No. 62/212,120, filed on Aug. 31, 2015.

(51) Int. Cl.
*H04L 12/40* (2006.01)
*G06F 21/85* (2013.01)
*H04L 9/40* (2022.01)
*B60R 16/023* (2006.01)
*G06F 13/40* (2006.01)

(52) U.S. Cl.
CPC ............ *G06F 21/554* (2013.01); *G06F 21/85* (2013.01); *H04L 12/40169* (2013.01); *H04L 63/1416* (2013.01); *H04L 63/1466* (2013.01)

(56) References Cited

U.S. PATENT DOCUMENTS

| 9,794,286 | B2  |    | 10/2017 | Otsuka |              |
|-----------|-----|----|---------|--------|--------------|
| 2008/0244691 | A1 | *  | 10/2008 | Hilerio | ............... H04L 63/20 |
|           |     |    |         |        | 726/1        |
| 2012/0307836 | A1 |    | 12/2012 | Ishigooka |          |
| 2014/0328352 | A1 |    | 11/2014 | Mabuchi et al. |   |
| 2015/0172306 | A1 |    | 6/2015  | Kim et al. |       |

OTHER PUBLICATIONS

The Extended European Search Report from the European Patent Office (EPO) dated Aug. 10, 2018 for the related European Patent Application No. 16841047.0.

English Translation of Chinese Search Report dated Jul. 25, 2022 for Chinese Patent Application No. 202011109730.7.

* cited by examiner

| ID | RECEPTION INTERVAL (ms) | MARGINS (ms) |
|---|---|---|
|  | ID: 0x200 |  |
| 0x100 | 25 | 3 |

| ID | RECEPTION TIMING (ms) |
|---|---|
| 0x100 | 201 |
| 0x200 | 176 |

| ID | RECEPTION INTERVAL (ms) | | | MARGINS (ms) |
|---|---|---|---|---|
| | ID: 0x100 | ID: 0x200 | ID: 0x300 | |
| 0x100 | 50 | 25 | +2 | 3 |
| 0x200 | 25 | 50 | +2 | 3 |
| 0x300 | -2 | -2 | 48 | 3 |

FIG. 14

| ID | RECEPTION TIMING (ms) | NEXT RECEPTION TIMING CANDIDATE | MISUSE OCCURRENCE STATE | PREVIOUS RECEPTION INTERVAL (ms) | | |
|---|---|---|---|---|---|---|
| | | | | ID: 0x100 | ID: 0x200 | ID: 0x300 |
| 0x100 | 151 | 201 | MISUSED | 51 | 25 | 10 |
| 0x200 | 176 | NONE | NOT MISUSED | 25 | 51 | 33 |
| 0x300 | 190 | NONE | NOT MISUSED | 41 | 15 | 48 |

FIG. 15

| ID | DLC | DATA FIELD |
|---|---|---|
| 0x300 | 1 | 0x10 |

VEHICLE SPEED (km/h)

MISUSE DETECTION METHOD, MISUSE DETECTION ELECTRONIC CONTROL UNIT, AND MISUSE DETECTION SYSTEM

CROSS-REFERENCE TO RELATED APPLICATIONS

This application is a Continuation of U.S. patent application Ser. No. 15/873,952, filed on Jan. 18, 2018, which is Continuation of International Application No. PCT/JP2016/003567, filed on Aug. 3, 2016, which in turn claims the benefit of Japanese Application No. 2016-097047, filed May 13, 2016 and claims priority to U.S. Provisional Patent Application No. 62/212,120, filed Aug. 31, 2015. The disclosure of each of these documents, including the specification, drawings, and claims, is incorporated herein by reference in its entirety.

BACKGROUND

1. Technical Field

The present disclosure relates to a technique for detecting transmission of an unauthorized frame in a vehicle network in which electronic control units communicate with one another.

2. Description of the Related Art

During these years, a large number of devices called "electronic control units (ECUs)" are provided in a system inside an automobile. A network connecting these ECUs with one another is called a "vehicle network". A lot of standards exist for vehicle networks. A standard called a "controller area network (CAN)" specified in International Organization for Standardization (ISO) 11898-1 exists for one of principal vehicle networks.

In the CAN, a communication path is configured by two buses, and ECUs connected to the buses are called "nodes". The nodes connected to the buses communicate messages called "frames". A transmission node, which transmits a frame, applies voltage to the two buses to generate a potential difference between the buses and transmit a value of "1" called a "recessive" and a value of "0" called a "dominant". If a plurality of transmission nodes transmit a recessive and a dominant at exactly the same timing, the dominant takes priority in transmission. If a format of a received frame is abnormal, a reception node transmits a frame called an "error frame". An error frame refers to successive transmission of 6 bits of dominants for notifying a transmission node and other reception nodes of an abnormality in a frame.

In the CAN, there are no identifiers (IDs) identifying destinations and sources. A transmission node transmits each frame with an ID added (that is, transmits a signal to the buses), and each reception node receives only a frame having a predetermined ID (that is, reads a signal from the buses). In addition, a carrier sense multiple access/collision avoidance (CSMA/CA) method is employed, and when a plurality of nodes simultaneously perform transmission, mediation is carried out using message IDs. That is, a frame whose message ID is smaller takes priority in transmission.

In a vehicle network system according to the CAN, there is a threat that an attacker might access busses and transmit an unauthorized frame to improperly control ECUs, and security measures are being examined.

A vehicle network monitoring apparatus described in Japanese Patent No. 5664799, for example, implements a misuse detection method in which a frame transmitted to busses of the CAN is determined to be unauthorized if a difference between a reception interval measured in relation to the frame and a predetermined communication interval falls outside a specified reference range.

SUMMARY

In one general aspect, the techniques disclosed here feature a misuse detection method used in a vehicle network system including a plurality of electronic control units that communicate with one another through buses in accordance with a CAN protocol. The misuse detection method includes receiving a target data frame and a reference data frame which are transmitted through the buses, wherein the target data frame is a data frame having a first identifier and wherein the reference data frame is a data frame having a second identifier different from the first identifier and performing, as misuse detection for the target data frame, evaluation in accordance with a reception timing of the reference data frame and a reception timing of the target data frame on the basis of a certain rule specifying a reception interval between the reference data frame and the target data frame.

According to the present disclosure, a possibility of erroneously detecting an authorized frame as an unauthorized frame is reduced even if an unauthorized node is connected to buses of the CAN and an unauthorized frame is transmitted, and the transmission of the unauthorized frame can be appropriately detected.

It should be noted that general or specific embodiments may be implemented as a system, a method, an integrated circuit (IC), a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 14 is a diagram illustrating an example of reception state information held by a reception state holding portion in the misuse detection ECU according to the second embodiment;

FIG. 15 is a diagram illustrating an example of a data frame transmitted by an ECU according to the second embodiment;

DETAILED DESCRIPTION

Figure 1:
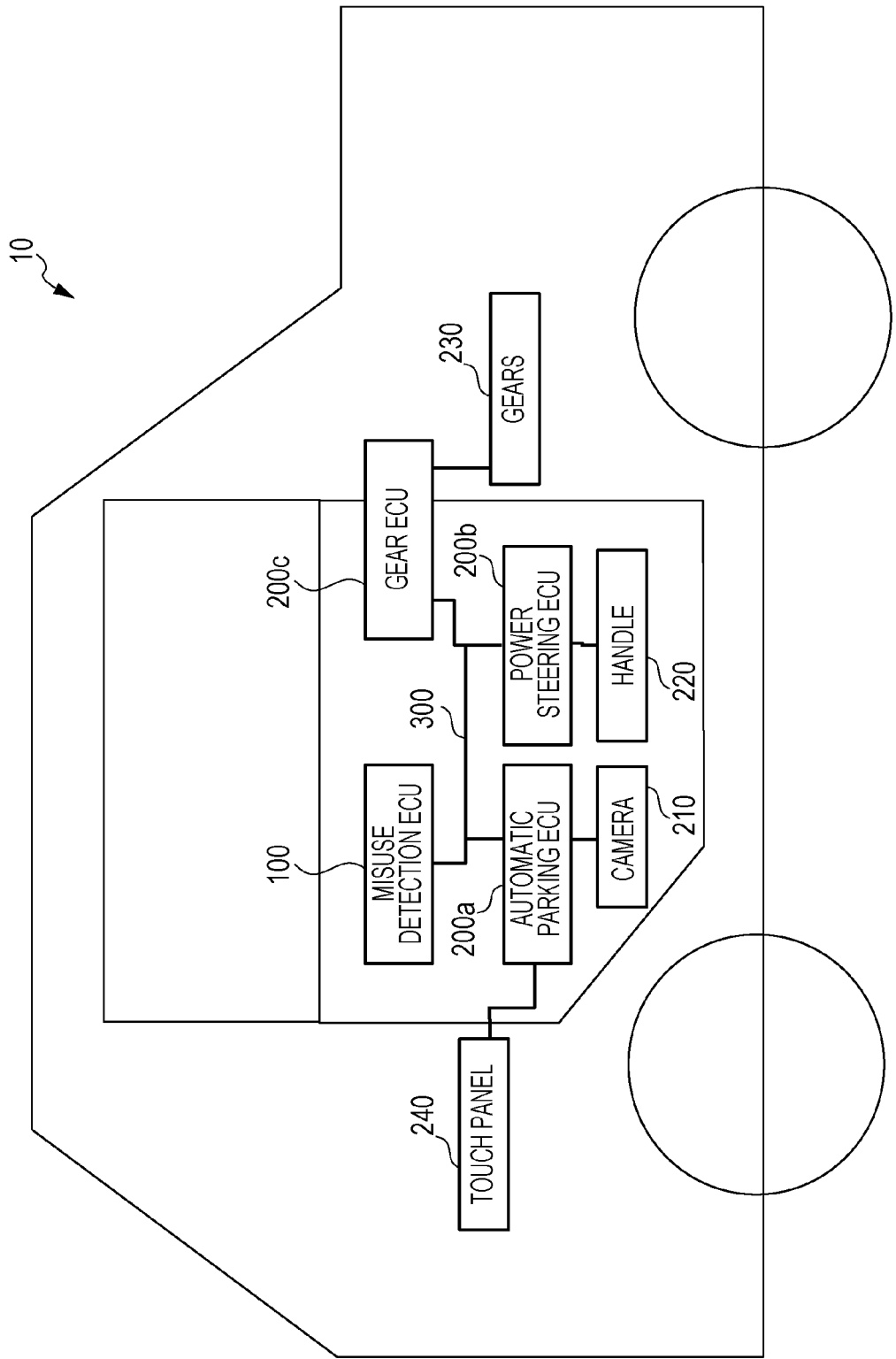
FIG. 1 is a diagram illustrating the overall configuration of a vehicle network system according to a first embodiment.

Underlying Knowledge Forming Basis of Present Disclosure

According to a misuse detection method of Japanese Patent No. 5664799, if a plurality of frames are received within a reference range based on a predetermined communication interval, an unauthorized frame transmitted by an attacker might be included in the plurality of frames. If a reference range based on the predetermined communication interval is determined for a determination as to a frame to be received next on the basis of a reception timing of the unauthorized frame within the reference range, an authorized frame can consequently be determined to be unauthorized.

The present disclosure provides a misuse detection method by which a possibility of erroneously detecting an authorized frame as an unauthorized frame is reduced even if an unauthorized frame is received within a range of errors of a predetermined communication interval and misuse detection can be appropriately performed. In addition, the present disclosure provides a misuse detection electronic control unit (misuse detection ECU), which is an ECU capable of achieving the misuse detection method, and a misuse detection system that achieves the misuse detection method.

A misuse detection method according to an aspect of the present disclosure is a misuse detection method used in a vehicle network system including a plurality of electronic control units that communicate with one another through buses in accordance with a CAN protocol. The misuse detection method includes receiving a target data frame and a reference data frame which are transmitted through the buses, wherein the target data frame is a data frame having a first identifier and wherein the reference data frame is a data frame having a second identifier different from the first identifier and performing, as misuse detection for the target data frame, evaluation in accordance with a reception timing of the reference data frame and a reception timing of the target data frame on the basis of a certain rule specifying a reception interval between the reference data frame and the target data frame. As a result, since a data frame having an ID different from an ID of a data frame subjected to misuse detection is used as a reference for a reception interval, a possibility of erroneously detecting an authorized data frame as an unauthorized data frame is reduced even if an unauthorized node is connected to the buses and an unauthorized data frame is transmitted, and the transmission of the unauthorized data frame can be appropriately detected.

In addition, in the performing evaluation, if a relationship between the reception timing of the target data frame and the reception timing of the reference data frame complies with the certain rule, it may be evaluated that the target data frame is not unauthorized. If the relationship does not comply with the certain rule, it may be evaluated that the target data frame is unauthorized. As a result, it can be checked through alternative evaluation whether a data frame subjected to misuse detection is unauthorized. It is to be noted that whether a data frame subjected to misuse detection can be determined on the basis of a result of the evaluation or a combination of the result and other types of evaluation.

In addition, the certain rule may specify an appropriate range of the reception interval. In the performing evaluation, if a difference between the reception timing of the target data frame and the reception timing of the reference data frame prior to the foregoing reception timing falls within the appropriate range, it may be evaluated that the certain rule is complied with. As a result, evaluation can be performed such that it is determined that a target data frame is not unauthorized if a reception intervals between data frames falls within a range of allowable errors.

In addition, the misuse detection method may further include evaluating, as misuse detection for the target data frame, whether the target data frame is unauthorized in accordance with an interval between the reception timing of the target data frame and a reception timing of the target data frame prior to the foregoing reception timing. The misuse detection in the evaluating may be performed prior to the misuse detection in the performing evaluation, and after it is evaluated in the evaluating that the target data frame is unauthorized, the misuse detection in the evaluating may be stopped and the misuse detection in the performing evaluation may start. As a result, since a reference for a reception interval for misuse detection is switched when a state in which it is inappropriate to continue misuse detection based on a reception interval between data frames subjected to the misuse detection has occurred, appropriate misuse detection can be performed.

In addition, in the evaluating, if the reception timing of the target data frame falls outside an appropriate time frame predetermined on the basis of the reception timing of the target data frame prior to the foregoing reception timing, or if the reception timing of the target data frame falls within the appropriate time frame and the other target data is received at a timing within the appropriate time frame, it may be evaluated as the misuse detection for the target data frame that the target data frame is unauthorized. As a result, a reference for a reception interval for misuse detection is switched when a state in which it is inappropriate to continue misuse detection based on a reception interval between data frames subjected to the misuse detection has occurred.

In addition, in the receiving, another reference data frame may be received transmitted through the buses, wherein the other reference data frame may be a data frame having a third identifier different from the first identifier or the second identifier. The misuse detection method may further include performing misuse detection for the reference data frame and subsequently performing, as misuse detection for the target data frame, evaluation in accordance with a reception timing of the other reference data frame and the reception timing of the target data frame on the basis of a rule specifying a reception interval between the other reference data frame and the target data frame. If it is detected in the performing misuse detection that the reference data frame is unauthorized, the misuse detection in the performing evaluation may be stopped and the misuse detection in the subsequently performing may start. As a result, when misuse of a data frame that serves as a reference for a reception interval for misuse detection has been detected, a data frame that serves as the reference can be switched to continue appropriate misuse detection.

In addition, the misuse detection in the performing evaluation may start after one of a plurality of identifiers different from the first identifier selected in accordance with a predetermined selection criterion is determined as the second identifier, and the misuse detection in the subsequently performing may start after one of a plurality of identifiers different from the first identifier or the second identifier selected in accordance with the predetermined selection criterion is determined as the third identifier. As a result, if misuse of a data frame that serves as a reception interval for misuse detection is detected, the reference can be changed to an appropriate data frame to continue misuse detection, insofar as a selection criterion is appropriately predetermined.

In addition, the misuse detection in the performing evaluation may be performed after one of a plurality of identifiers different from the first identifier, the one of the plurality of identifiers being an identifier of a data frame with which misuse has not yet been detected, is determined as the second identifier. As a result, misuse detection can be performed appropriately compared to when a data frame with which misuse has been detected is used as a reference for a reception interval for the misuse detection.

In addition, the misuse detection in the performing evaluation may be performed after one of a plurality of identifiers different from the first identifier is determined as the second identifier in accordance with a state of a vehicle on which the plurality of electronic control units are mounted. As a result, misuse detection can be appropriately performed using a reference that suits the state of the vehicle as a reference for a reception interval for the misuse detection.

In addition, in the performing evaluation, the evaluation whether the target data frame is unauthorized may be performed in accordance with a reception timing of each of at least one data frame each having an identifier different from the first identifier or the second identifier and the reference data frame and the reception timing of the target data frame on the basis of a group of rules including the certain rule specifying a reception interval between each of the at least one data frame and the reference data frame and the target data frame, and whether the target data frame is unauthorized may be determined on the basis of a result of the evaluation. As a result, a determination whether a data frame is unauthorized can be comprehensively and accurately made using results of evaluation based on rules relating to a plurality of reception intervals.

In addition, in the performing evaluation, the evaluation may be performed by calculating a likelihood that the target data frame is unauthorized through a certain calculation based on a group of rules including the certain rule specifying a reception interval between each of at least one data frame each having an identifier different from the first identifier or the second identifier and the reference data frame and the target data frame, a reception timing of each of the at least one data frame and the reference data frame, and the reception timing of the target data frame. As a result, a likelihood that a data frame is unauthorized can be obtained.

In addition, the misuse detection method may further include recording a result of the evaluation performed in the performing evaluation in a storage medium. As a result, a process that utilizes a result of evaluation relating to misuse detection for a data frame can be achieved.

In addition, a misuse detection electronic control unit according to an aspect of the present disclosure is a misuse detection electronic control unit in a vehicle network system including a plurality of electronic control units that communicate with one another through buses in accordance with a CAN protocol. The misuse detection electronic control unit includes a reception unit that receives a target data frame and a reference data frame which are transmitted through the buses, wherein the target data frame is a data frame having a first identifier and wherein the reference data frame is a data frame having a second identifier different from the first identifier, a rule holding unit that holds rule information indicating a certain rule specifying a reception interval between the target data frame and the reference data frame and a detection unit that performs, as misuse detection for the target data frame, evaluation in accordance with a reception timing of the reference data frame and a reception timing of the target data frame on the basis of the certain rule. As a result, a possibility of erroneously detecting an authorized frame as an unauthorized frame is reduced even if an unauthorized node is connected to buses and an unauthorized frame is transmitted, and the transmission of the unauthorized frame can be appropriately detected.

In addition, a misuse detection system according to an aspect of the present disclosure is a misuse detection system for misuse detection in a vehicle network system including a plurality of electronic control units that communicate with one another through buses in accordance with a CAN protocol. The misuse detection system includes a reception unit that receives a target data frame and a reference data frame transmitted through the buses, wherein the target data frame is a data frame having a first identifier and wherein the reference data frame is a data frame having a second identifier different from the first identifier, a rule holding unit that holds rule information indicating a certain rule specifying a reception interval between the target data frame and the reference data frame and a detection unit that performs, as misuse detection for the target data frame, evaluation in accordance with a reception timing of the reference data frame and a reception timing of the target data frame on the basis of the certain rule. As a result, transmission of an unauthorized data frame can be appropriately detected.

It should be noted that these general or specific aspects may be implemented as a system, a method, an integrated circuit, a computer program, a computer-readable recording medium such as a compact disc read-only memory (CD-ROM), or any selective combination thereof.

Vehicle network systems according to embodiments will be described hereinafter with reference to the drawings. The embodiments described hereinafter are specific examples of the present disclosure. Values, components, the arrangement and connection modes of the components, steps, the order of the steps, and the like mentioned in the following embodiments, therefore, are examples and do not limit the present disclosure. Among the components described in the following embodiments, ones not described in the independent claims can be arbitrarily added. The drawings are schematic diagrams and not necessarily exact.

First Embodiment

A misuse detection method used in a vehicle network system 10 with which a plurality of ECUs communicate through buses will be described hereinafter with reference to the drawings as an embodiment of the present disclosure.

The misuse detection method is a method for detecting an unauthorized frame transmitted after an unauthorized node is connected to buses of a CAN and mainly implemented by a misuse detection ECU connected to the buses. A misuse detection ECU 100 in the vehicle network system 10 detects an unauthorized data frame on the basis of a reception interval between data frames (messages) having two different identifiers (message IDs). As a result, if an unauthorized data frame is transmitted, a possibility of erroneously detecting an authorized data frame having the same identifier (message ID) as the unauthorized data frame as an unauthorized data frame is reduced.

1.1 Overall Configuration of Vehicle Network System 10

FIG. 1 is a diagram illustrating the overall configuration of the vehicle network system 10 according to the first embodiment.

The vehicle network system 10 is an example of a network communication system that performs communication in accordance with a CAN protocol and is a network communication system in a vehicle on which various devices such as control devices, sensors, actuators, and user interface devices are mounted. The vehicle network system 10 includes a plurality of devices that perform communication relating to frames through the buses and uses the misuse detection method. More specifically, as illustrated in FIG. 1, the vehicle network system 10 is configured by including buses 300 and various nodes connected to the buses 300 including the misuse detection ECU 100 and ECUs connected to the various devices, such as an ECU (automatic parking ECU) 200a, an ECU (power steering ECU) 200b, and an ECU (gear ECU) 200c. It is to be noted that a number of ECUs can be included in the vehicle network system 10 in addition to the misuse detection ECU 100 and the ECUs 200a, 200b, and 200c, but the misuse detection ECU 100 and the ECUs 200a, 200b, and 200c will be mainly described hereinafter for the sake of convenience. An ECU, for example, is a device including a digital circuit, an analog circuit, a communication circuit, and the like such as a processor (microprocessor) and a memory. A memory is a read-only memory (ROM), a random-access memory (RAM), or the like and is capable of storing a control program (computer program) executed by the processor.

When the processor operates in accordance with the control program (computer program), for example, the ECU achieves various functions thereof. It is to be noted that the computer program is configured by combining a plurality of command codes indicating instructions to the processor in order to achieve certain functions.

The automatic parking ECU 200a, the power steering ECU 200b, and the gear ECU 200c are connected to the buses 300 and to a camera 210, a handle (steering wheel) 220, and gears (speed change mechanism) 230, respectively.

In addition, the automatic parking ECU 200a is connected to a touch panel 240 and receives an operation from a passenger. The automatic parking ECU 200a periodically transmits data frames to the buses 300. In addition, if a passenger operates the touch panel 240, the automatic parking ECU 200a enters an automatic parking mode and transmits a signal specifying a steering angle of the handle 200 to the buses 300 while obtaining information from the camera 210. The power steering ECU 200b receives a data frame on the buses 300 and, if there is a handle steering instruction, turns the handle 200 by a specified angle. The gear ECU 200c obtains a state of the gears 230 and periodically transmits data frames indicating the state of the gears 230 to the buses 300.

The misuse detection ECU 100 is a kind of ECU connected to the buses 300 and has a function of performing a misuse detection process, by which data frames flowing through the buses (that is, data frames appearing on the buses) are monitored and whether an unauthorized data frame (that is, a data frame that does not comply with a predetermined rule) is flowing is determined.

In the vehicle network system 10, the ECUs communicate frames in accordance with the CAN protocol. Frames according to the CAN protocol include a data frame, a remote frame, an overload frame, and an error frame. The data frame will be mainly described hereinafter.

1.2 Data Frame Format

The data frame, which is one of the frames used in a network according to the CAN protocol, will be described hereinafter.

Figure 2:
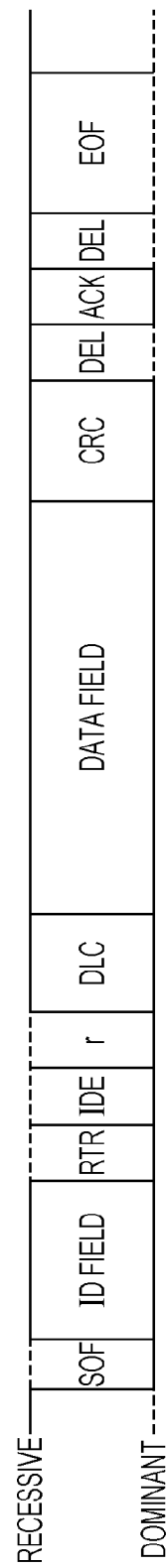
FIG. 2 is a diagram illustrating a format of a data frame specified in a CAN protocol.

FIG. 2 is a diagram illustrating a format of the data frame specified in the CAN protocol. The figure illustrates a data frame in a standard ID format specified in the CAN protocol. The data frame is configured by fields of an start of frame (SOF), an ID field, an remote transmission request (RTR), an identifier extension (IDE), a reserved bit "r", a data length code (DLC), a data field, a cyclic redundancy check (CRC) sequence, a CRC delimiter "DEL", an acknowledgement (ACK) slot, an ACK delimiter "DEL", and an end of frame (EOF).

The SOF is configured by a 1-bit dominant. When the buses are idle, the data frame is recessive. By making the data frame dominant using the SOF, start of transmission of the frame is notified.

The ID field is a field storing an ID (frame ID), which is a value configured by 11 bits and indicating a type of data. The ID field is designed such that a frame having a smaller ID value has higher priority, so that if a plurality of nodes simultaneously start transmission, the communication can be mediated using the ID field.

The RTR is a value for distinguishing a data frame and a remote frame. In the data frame, the RTR is configured by a dominant 1 bit.

The IDE and the "r" are both configured by a dominant 1 bit.

The DLC is a value configured by 4 bits and indicating the length of the data field. The 4 bits in the data frame storing a value of the DLC will also be referred to as a "DLC field" herein.

The data field is a value configured by up to 64 bits and indicating the content of data to be transmitted. The length can be adjusted in steps of 8 bits. Specifications of the data to be transmitted are not specified in the CAN protocol but determined by the vehicle network system 10. The specifications, therefore, depend upon a vehicle model, a manufacturer (manufacturing maker), and the like.

The CRC sequence is configured by 15 bits. The CRC sequence is obtained from values transmitted in the SOF, the ID field, a control field, and the data field.

The CRC delimiter is a delimitation sign configured by a 1-bit recessive and indicating an end of the CRC sequence. It is to be noted that the CRC sequence and the CRC delimiter will be collectively referred to as a "CRC field".

The ACK slot is configured by 1 bit. A transmission node performs transmission with the ACK slot recessive. If a reception node can correctly receive a data frame up to the CRC sequence, the reception node performs transmission with the ACK slot dominant. Since a dominant takes priority over a recessive, if the ACK slot is dominant after the transmission, the transmission node can affirm that one of reception nodes has successfully received the data frame.

The ACK delimiter is a delimitation sign configured by a 1-bit recessive and indicating an end of the ACK.

The EOF is configured by 7 bits of recessives and indicates an end of the data frame.

1.3 Error Frame Format

Figure 3:
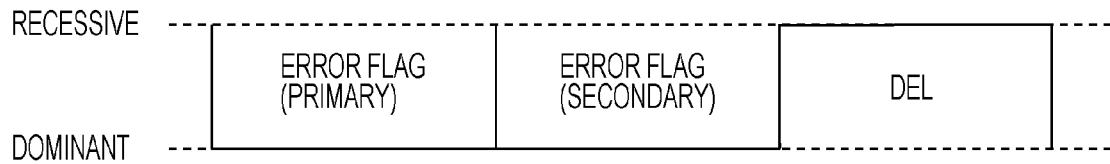
FIG. 3 is a diagram illustrating a format of an error frame specified in the CAN protocol.

FIG. 3 is a diagram illustrating a format of the error frame specified in the CAN protocol. The error frame is configured by an error flag (primary), an error flag (secondary), and an error delimiter.

The error flag (primary) is used for notifying other nodes of occurrence of an error. A node that has detected an error successively transmits 6 bits of dominants in order to notify other nodes of occurrence of the error. Because the transmission violates a bit stuffing rule (6 bits or more of the same value must not be successively transmitted) of the CAN protocol, the other nodes are caused to transmit error frames (secondary).

The error flag (secondary) is configured by 6 consecutive bits of dominants used for notifying other nodes of occurrence of an error. All nodes that have received an error flag (primary) and detected a violation of the bit stuffing rule transmit an error flag (secondary).

The error delimiter "DEL" is 8 consecutive bits of recessives and indicates an end of the error frame.

1.4 Configuration of Misuse Detection ECU 100

Figure 4:
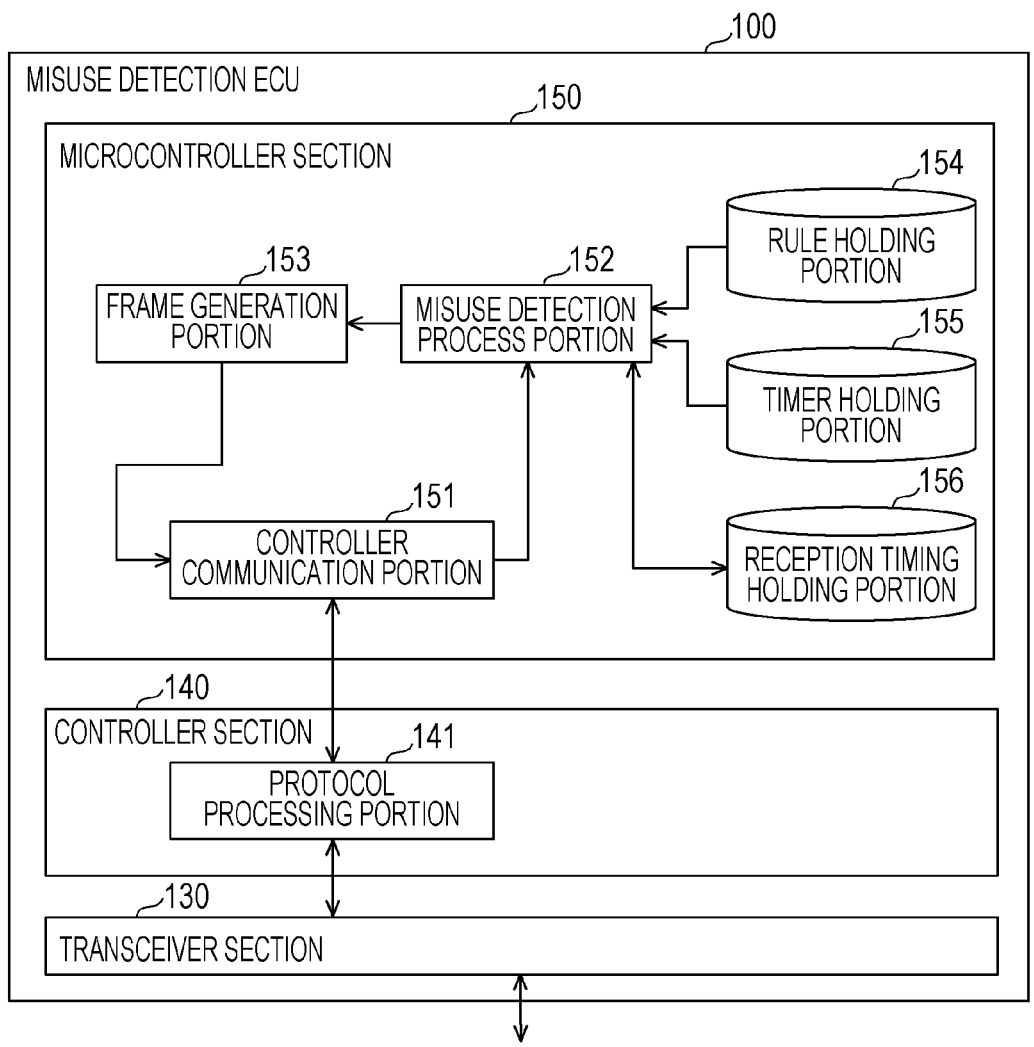
FIG. 4 is a configuration diagram of a misuse detection ECU according to the first embodiment.

FIG. 4 is a configuration diagram of the misuse detection ECU 100. The misuse detection ECU 100 is configured by including a transceiver section 130, a controller section 140, and a microcontroller section 150.

The transceiver section 130 is an electronic circuit such as a communication circuit. The transceiver section 130 converts a frame transmitted from the controller section 140 into an electrical signal that can be transmitted to the buses 300 and transmits the electrical signal. In addition, the transceiver section 130 receives an electrical signal appearing on the buses 300 in order to transmit the content of a received frame to the controller section 140. The transceiver section 130 functions as a reception unit that receives a data frame transmitted through the buses 300.

The controller section 140 is a semiconductor integrated circuit that includes a digital circuit and a storage medium such as a memory and that communicates signals with the microcontroller section 150 and the transceiver section 130. The controller section 140 includes a protocol processing portion 141.

The protocol processing portion 141 communicates with the transceiver section 130 and performs processing according to a protocol (CAN protocol or the like). If detecting an error in a frame that is being received, for example, the protocol processing portion 141 instructs the transceiver section 130 to transmit an error frame (that is, a transmission request) in order to cause the transceiver section 130 to transmit an error frame. After reception of a data frame is completed, the protocol processing portion 141 notifies the microcontroller section 150 of the completion of the reception of the data frame. In response to a data frame transmission request from the microcontroller section 150, the protocol processing portion 141 instructs the transceiver section 130 to transmit a data frame in accordance with the protocol. In addition, the protocol processing portion 141 gives the microcontroller section 150 the content (an ID, a DLC, data, and the like) of a data frame appearing on the buses 300 obtained through the transceiver section 130.

The microcontroller section 150 is a semiconductor integrated circuit that includes a processor (microprocessor) which executes a program and a memory and that communicates signals with the controller section 140. The microcontroller section 150 includes a controller communication portion 151, a misuse detection process portion 152, a frame generation portion 153, a rule holding portion 154, a timer holding portion 155, and a reception timing holding portion 156 as components achieved by the processor that executes a program, the memory, and the like.

The controller communication portion 151 transmits a data frame received from the controller section 140 to the misuse detection process portion 152. The controller communication portion 151 transmits a data frame transmitted from the frame generation portion 153 to the controller section 140 and issues a data frame transmission request.

The misuse detection process portion 152 functions as a detection portion that performs a misuse detection process on a data frame transmitted from the controller communication portion 151. The misuse detection process is a process for evaluating misuse of a data frame transmitted through the buses 300, that is, a data frame appearing on the buses 300. The evaluation of the misuse of a data frame is specifically evaluation whether a data frame transmitted through the buses 300, that is, a data frame appearing on the buses 300, is unauthorized, that is, a determination whether the data frame complies with the predetermined rule. In the misuse detection process, whether a currently received data frame is unauthorized is determined by referring to rule information indicating a misuse detection rule stored in the rule holding portion 154, information regarding a current timing stored in the timer holding portion 155, and reception timing information indicating a past reception timing of a data frame stored in the reception timing holding portion 156. Although a rule relating to a reception interval will be mainly described hereinafter as the misuse detection rule for the sake of convenience of description, the misuse detection rule can include a rule other than that relating to a reception interval. If an ID (message ID) of a data frame that is being received is specified as a target of the misuse detection rule in the rule information stored in the rule holding portion 154, the misuse detection process portion 152 checks, as the misuse detection process, whether its reception timing falls within a range determined by a reception interval from a reception timing of another data frame that serves as a reference for the reception interval and margins. It is to be noted that if the reception timing of the received data frame falls within the range based on the reception interval and the margins indicated by the rule information, the received data frame is authorized, and if not, the received data frame is unauthorized. That is, if a relationship between reception timings of data frames complies with the misuse detection rule relating to the reception interval and the margins indicated by the rule information, the data frame is authorized, and if not, the data frame is unauthorized. If it is determined (judged) that a received data frame is unauthorized, the misuse detection process portion 152 can transmit information regarding the unauthorized data frame to the frame generation portion 153 in order to notify the ECUs of occurrence of misuse (the transmission of the unauthorized data frame). If detecting an unauthorized data frame, the misuse detection process portion 152 may count and record an accumulated number of times of detection of misuse for each of IDs of data frames and use the record for a comprehensive determination of misuse for each of the IDs of data frames. Alternatively, the misuse detection process portion 152 may record log information regarding unauthorized data frames (e.g., IDs and other pieces of information regarding the unauthorized data frames, reception times, and the like) in a recording medium (storage medium) or the like or perform control for reporting misuse (display, transmission of information to a server apparatus located outside the vehicle, or the like).

If receiving information regarding a data frame determined by the misuse detection process portion 152 to be unauthorized, for example, the frame generation portion 153 transmits, to the controller communication portion 151, a data frame transmission request including the information regarding the unauthorized data frame.

The rule holding portion 154 holds the rule information (refer to FIG. 5) indicating the misuse detection rule, which is a rule about a communication interval (reception interval) between data frames to be referred to by the misuse detection process portion 152.

The timer holding portion 155 holds the information indicating the current timing (present time) measured on the basis of a timing mechanism such as a counter and is referred to by the misuse detection process portion 152 in order to obtain a timing at which a data frame has been received. The current timing may be measured from any point of time and, for example, can be measured while determining a time at which power is supplied to the misuse detection ECU 100 as zero.

The reception timing holding portion 156 holds the reception timing information obtained by recording, for each ID, a reception timing of a data frame received in the past. The reception timing information (refer to FIG. 6) is referred to by the misuse detection process portion 152 and used in a determination whether a currently received data frame is unauthorized.

1.5 Misuse Detection Rule

Figures 5, 6, 7:
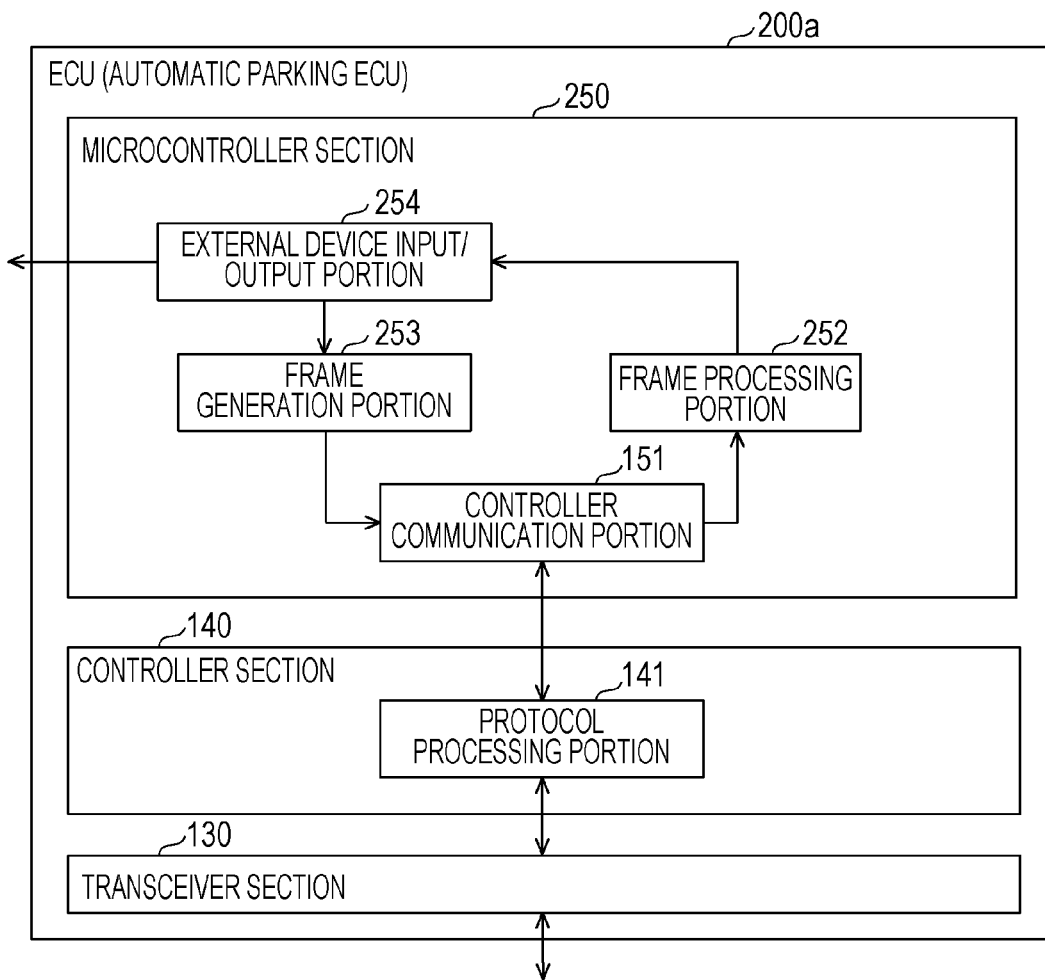
FIG. 5 is a diagram illustrating an example of rule information held by a rule holding portion in the misuse detection ECU according to the first embodiment.
FIG. 6 is a diagram illustrating an example of reception timing information stored in a reception timing holding portion in the misuse detection ECU according to the first embodiment.
FIG. 7 is a configuration diagram of an ECU according to the first embodiment.

FIG. 5 is a diagram illustrating an example of the rule information indicating the misuse detection rule held by the rule holding portion 154. In the example illustrated in the figure, a reception interval relating to data frames whose IDs (message IDs) are 0x100 is indicated. The misuse detection ECU 100 performs misuse detection on the basis of a reception interval between a data frame not subjected to a check (misuse detection) (referred to as a "reference data frame") and a data frame subjected to the misuse detection (referred to as a "target data frame"). According to the rule information in the example illustrated in the figure, the misuse detection ECU 100 performs misuse detection on a target data frame whose ID is 0x100 on the basis of a reception interval between a reference data frame whose ID is 0x200 and the target data frame whose ID is 0x100. If a reception timing of the target data frame whose ID is 0x100 is 25 ms, which is the reception interval, after a reception timing of the reference data frame (the data frame whose ID is 0x200 in this example), the target data frame whose ID is 0x100 is authorized.

Margins of ±3 ms are provided for the reception interval of 25 ms in consideration of a fluctuation in the reception interval caused by mediation (retransmission control) in the case of a collision between data frames in the buses 300. It is to be noted that a one retransmission interval when a collision occurs between data frames in the buses 300 is, for example, shorter than 1 ms. In the example illustrated in FIG. 5, if the reception interval between the reference data frame whose ID is 0x200 and the target data frame whose ID is 0x100 falls within a range of 22 ms to 28 ms, the target data frame is determined to be authorized, and if not, the target data frame is determined to be unauthorized.

Although an example of the misuse detection rule relating only to the data frame whose ID is 0x100 has been described in this example, a misuse detection rule for a plurality of IDs may be predetermined, instead. In addition, although an example in which the rule information indicates a misuse detection rule specifying a reception interval relating to a reference data frame of a single ID (0x200) has been described, the number of IDs of data frames that serve as reference data frames is not limited to one, but may be two, or may be three or more. In addition, when the rule information indicates a rule relating to IDs and reception intervals of a plurality of reference data frames, the misuse detection process portion 152 can use an arbitrary number of rules for misuse detection. For example, when there are five rules relating to reception intervals and three (rules specifying reception intervals in which data frames having three different IDs are used as reference data frames) of the five rules have been used for misuse detection, it may be comprehensively determined that there has been misuse if one of the three rules is not complied with, or it may be comprehensively determined that there has not been misuse if one of the three rules is complied with. Alternatively, by a majority rule, if data frames are determined to be unauthorized on the basis of two or more of the three rules used for the misuse detection (if two or more rules are not complied with), it may be comprehensively determined that there has been misuse, and if data frames are determined to be authorized on the basis of two or more rules (if two or more rules are complied with), it may be comprehensively determined that there has not been misuse. In addition, although a reception interval between target data frames whose IDs are 0x100 is not included in the misuse detection rule in the example illustrated in FIG. 5, the reception interval (e.g., 50 ms) between data frames whose IDs are 0x100, for example, may be included in the misuse detection rule. In addition, the content of the rule may be encrypted and held.

1.6 Reception Timing Information

FIG. 6 is a diagram illustrating an example of the reception timing information stored in the reception timing holding portion 156. In the reception timing information, a reception timing of a data frame received by the misuse detection ECU 100 in the past is recorded for each ID by referring to the current timing held by the timer holding portion 155. In the example illustrated in FIG. 6, it is indicated that a timing at which a data frame whose ID (message ID) is 0x100 has been previously received is 201 ms and a timing at which a data frame whose ID is 0x200 has been previously received is 176 ms.

1.7 Configuration of Automatic Parking ECU 200a

FIG. 7 is a configuration diagram of the ECU (automatic parking ECU) 200a. The ECU 200a includes a transceiver section 130, a controller section 140, and a microcontroller section 250.

The transceiver section 130 and the controller section 140 are the same as the transceiver section 130 and the controller section 140 of the misuse detection ECU 100 (refer to FIG. 4), and description thereof is omitted.

The microcontroller section 250 is a semiconductor integrated circuit that includes a processor which executes a program and a memory and that communicates signals with the controller section 140. The microcontroller section 250 includes a controller communication portion 151, a frame processing portion 252, a frame generation portion 253, and an external device input/output portion 254 as components achieved by the processor that executes a program, the memory, and the like.

The controller communication portion 151 is the same as the controller communication portion 151 in the misuse detection ECU 100 (refer to FIG. 4). The controller communication portion 151 in the ECU 200a, however, transmits a data frame received from the controller section 140 to the frame processing portion 252. The controller communication portion 151 transmits a data frame transmitted from the frame generation portion 253 to the controller section 140 to issue a data frame transmission request.

The frame processing portion 252 processes a data frame transmitted from the controller communication portion 151 and transmits a result to the external device input/output portion 254.

The frame generation portion 253 generates a data frame (refer to FIGS. 8A and 8B) on the basis of values transmitted from the external device input/output portion 254 and transmits the data frame to the controller communication portion 151.

The external device input/output portion 254 communicates with an external device connected to the ECU 200a. That is, the external device input/output portion 254 receives an instruction to enter the automatic parking mode in accordance with an operation performed using the touch panel 240, obtains information indicating surroundings of the vehicle whose image has been captured by the camera 210, and transmits the information to the frame generation portion 253.

The power steering ECU 200b and the gear ECU 200c, too, have the same configuration as the automatic parking ECU 200a. An external device input/output portion 254 in the power steering ECU 200b, however, transmits, to the handle 220 connected to the power steering ECU 200b, a control signal (a signal used for steering) based on values transmitted from the frame processing portion 252. An external device input/output portion 254 in the gear ECU 200c obtains the state of the gears 230 and notifies the frame generation portion 253 of the state of the gears 230.

1.8 Examples of Data Frames

Figure 8:
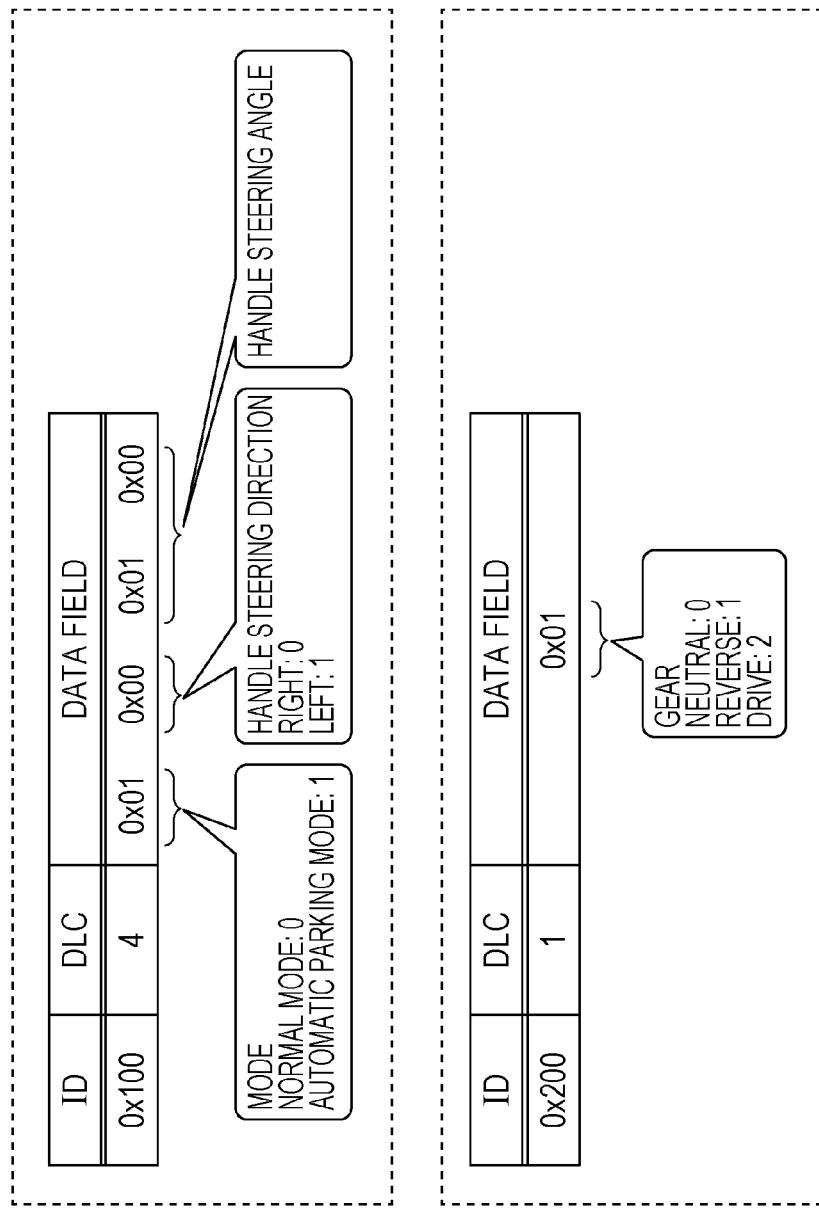
FIGS. 8A and 8B are diagrams illustrating examples of data frames transmitted by ECUs according to the first embodiment.

FIGS. 8A and 8B are diagrams illustrating examples of IDs (message IDs) and data fields (data) of data frames to be transmitted.

FIG. 8A illustrates an example of a data frame transmitted by the automatic parking ECU 200a, and FIG. 8B illustrates an example of a data frame transmitted by the gear ECU 200c.

A message ID of the data frame transmitted by the automatic parking ECU 200a is "0x100", and a DLC is "4" (four bytes). A first byte of a data field indicates a mode and is 1 in the case of the automatic parking mode. When the mode is not the automatic parking mode, values of a second byte and later in the data field are invalid. The second byte of the data field indicates which way the handle 220 is to be turned in the automatic parking mode. If the value is "0", the handle 220 is turned right, and if the value is "1", the handle 220 is turned left. Two bytes of third and fourth bytes in the data field collectively indicate an angle by which the handle 220 is to be turned. In the example illustrated in FIG. 8A, the automatic parking mode is established, and the handle 220 is to be turned right by 256 (0x100) degrees.

A message ID of the data frame transmitted by the gear ECU 200c is "0x200", and a DLC is "1" (one byte). A data field includes a value indicating the state of the gears 230. The value is "0" when the gears 230 are in a neutral state, "1" when the gears 230 are in a reverse state, and "2" when the gears 230 are in a drive state. In the example illustrated in FIG. 8B, it is indicated that the gears 230 are in the reverse state.

Figure 9:
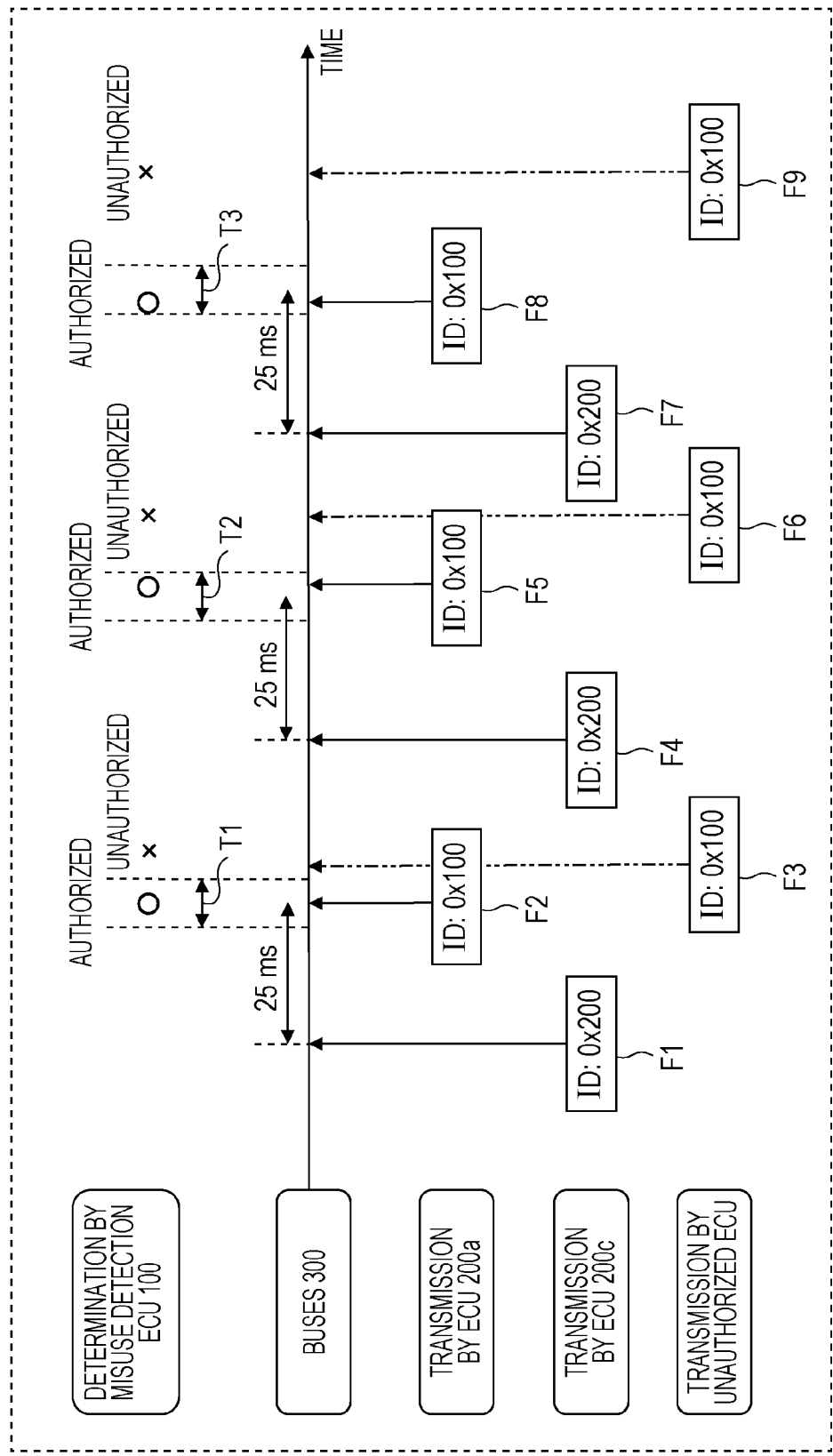
FIG. 9 is a diagram illustrating an example of a misuse detection operation performed by the misuse detection ECU on data frames according to the first embodiment.

1.9 Example of Misuse Detection Operation Performed by Misuse Detection ECU 100 on Data Frames FIG. 9 is a diagram illustrating an example in which the misuse detection ECU 100 receives data frames sequentially appearing on the buses 300 and performs misuse detection. In FIG. 9, a situation is illustrated in which data frames F2, F5, and F8 whose IDs are 0x100 periodically transmitted by the automatic parking ECU 200a and data frames F1, F4, and F7 whose IDs are 0x200 periodically transmitted by the gear ECU 200c sequentially appear on the buses 300. In addition, in FIG. 9, an attacker (unauthorized ECU) that can access the buses 300 periodically transmits unauthorized data frames F3, F6, and F9 whose IDs are 0x100 to the buses 300 in order to improperly control the handle 220. In this example, the misuse detection ECU 100 perform evaluation relating to misuse on the data frames whose IDs are 0x100 (more specifically, determinations whether the data frames are unauthorized) as misuse detection (check). Although not illustrated in FIG. 9, the misuse detection ECU 100 can perform misuse detection (evaluation relating to misuse) on the data frames whose IDs are not 0x100.

The misuse detection ECU 100 holds a timing at which the data frame F1, whose ID is 0x200, has been received as reception timing information. Next, the misuse detection ECU 100 checks, on the basis of the misuse detection rule indicated by the rule information held by the rule holding portion 154, whether a reception timing of the data frame F2, whose ID is 0x100, falls within a range T1, which is 22 ms to 28 ms after the reception timing (the timing indicated by the reception timing information) of the data frame F1, whose ID is 0x200. The range T1 indicates a time frame based on the reception timing of the data frame F1 that extends around the reception interval 25 ms indicated by the rule information (refer to FIG. 5) by margins of 3 ms. Because the data frame F2, whose ID is 0x100, transmitted by the automatic parking ECU 200a has been received at a timing within the range T1, the data frame F2 is determined as an authorized data frame. In addition, because it is determined, as a result of a determination as to the range T1 (that is, a determination whether the data frame is unauthorized), that the data frame F3, whose ID is 0x100 and which is transmitted by the attacker (unauthorized ECU), received next has not been received within the range T1, the data frame F3 is determined to be unauthorized.

In addition, similarly, the misuse detection ECU 100 holds a timing at which the data frame F4, whose ID is 0x200, has been received and checks whether a reception timing of the data frame F5, whose ID is 0x100, falls within a range T2, which is 22 ms to 28 ms after the reception timing of the data frame F4. Because the reception timing of the data frame F5 falls within the range T2, the misuse detection ECU 100 determines that the data frame F5 is authorized, and because the data frame F6, whose ID is 0x100, received next has not been received within the range T2, the misuse detection ECU 100 determines that the data frame F6 is unauthorized.

The misuse detection ECU 100 then determines, similarly, that the data frame F8, whose ID is 0x100, received within a range T3 is authorized and that the data frame F9, whose ID is 0x100, that has not been received within the range T3 is unauthorized, on the basis of a reception interval from a reception timing of the data frame F7, whose ID is 0x200.

1.10 Misuse Detection Process Performed by Misuse Detection ECU 100

A process performed by the misuse detection ECU 100 as the misuse detection process when a data frame is received will be described with reference to a flowchart of FIG. 10.

The misuse detection ECU 100 receives a data frame from the buses 300 (step S1101).

The misuse detection ECU 100 checks, on the basis of the rule information held by the rule holding portion 154, whether an ID of the received data frame is 0x100 (step S1102), and if the ID of the received data frame is not 0x100, checks whether the ID of the received data frame is 0x200 (step S1103).

If it is checked in step S1103 that the ID is 0x200, the misuse detection ECU 100 refers to the timer holding portion 155 to obtain the current timing, updates the reception timing information indicating the reception timing of a data frame relating to the ID of 0x200 stored in the reception timing holding portion 156 such that the reception timing information indicates the current timing (step S1104), and ends the process.

If it is checked in step S1103 that the ID is not 0x200, the misuse detection ECU 100 ends the process corresponding to the reception of one data frame.

If the ID of the data frame received in step S1101 is 0x100 (step S1102), the misuse detection ECU 100 determines whether its reception timing falls within a range 22 ms to 28 ms after reception of a data frame whose ID is 0x200 (step S1105). That is, the misuse detection ECU 100 checks whether the current timing obtained by referring to the timer holding portion 155 falls within a range extending from a value obtained by subtracting a margin (3 ms) from a timing obtained by adding a reception timing of the data frame (reference data frame) whose ID is 0x200 indicated by the reception timing information stored in the reception timing holding portion 156 and the reception interval (25 ms) from the data frame whose ID is 0x200 indicated by the rule information to a value obtained by adding a margin to the timing. If the reception timing of the data frame (target data frame) whose ID is 0x100 does not fall within the range based on the reception timing of the reference data frame, the misuse detection ECU 100 determines that the target data frame is unauthorized, and ends the process corresponding to the reception of one data frame (step S1106).

If, in step S1105, the reception timing of the target data frame whose ID is 0x100 falls within the range determined by the specified reception interval and the margins on the basis of the reception timing of the reference data frame, the misuse detection ECU 100 determines that the target data frame is authorized. That is, if the target data frame complies with the misuse detection rule specifying an appropriate range of a reception interval, the misuse detection ECU 100 determines that the target data frame is authorized, and if not, the misuse detection ECU 100 determines that the target data frame is unauthorized. The misuse detection ECU 100 then refers to the timer holding portion 155, updates the reception timing information indicating the reception timing of a data frame whose ID is 0x100 stored in the reception timing holding portion 156 such that the reception timing information indicates the current timing (step S1107), and ends the process corresponding to the reception of one data frame.

Figure 10:
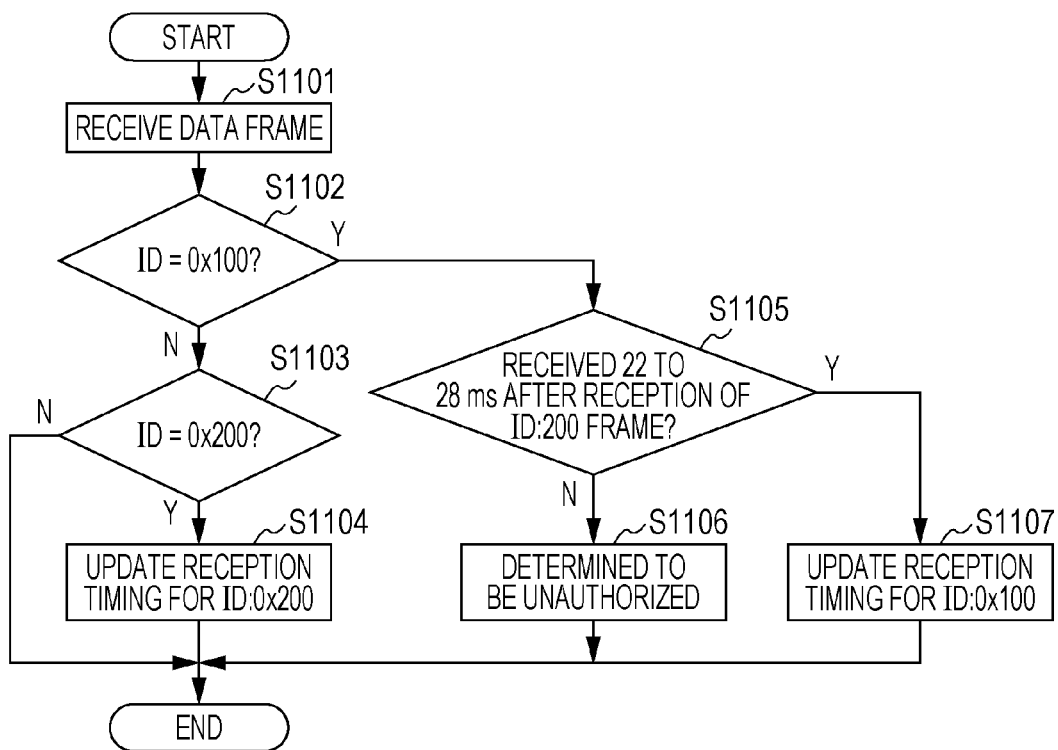
FIG. 10 is a flowchart illustrating a misuse detection process performed by the misuse detection ECU when a data frame is received according to the first embodiment.

Although an example in which misuse detection is performed on a data frame whose ID is 0x100 is mainly illustrated in FIG. 10, the misuse detection ECU 100 can perform misuse detection on a data frame having another ID as the misuse detection process. The reception timing information indicating the reception timing of a data frame whose ID is 0x100 updated in step S1107, for example, can be used as a reference for misuse detection other than that in the example illustrated in FIG. 10 (e.g., a check relating to a reception interval between data frames whose IDs are 0x100 or a check of data frames having other IDs).

The misuse detection process performed by the misuse detection ECU 100 thus includes a reception step (step S1101) of receiving a data frame transmitted through the buses 300. The misuse detection process also includes a detection step (e.g., steps S1102, S1105, S1106, and the like) of performing, as misuse detection for a target data frame, which is a data frame having a first identifier (e.g., the ID of 0x100), evaluation (a determination whether the target data frame is unauthorized or the like) in accordance with a reception timing of a reference data frame, which is a data frame having a second identifier (e.g., the ID of 0x200) different from the first identifier, and a reception timing of the target data frame on the basis of a certain rule (that is, the misuse detection rule indicated by the rule information) specifying a reception interval between the reference data frame and the target data frame.

1.11 Effects Produced by First Embodiment

In the vehicle network system 10 according to the first embodiment, the misuse detection ECU 100 performs evaluation relating to misuse of data frame (a determination whether a data frame is unauthorized or the like) on the basis of a reception interval between a data frame subjected to the evaluation and a data frame having an ID (message ID) different from the foregoing data frame.

As a result, transmission of an unauthorized data frame performed by an attacker (an unauthorized ECU that accesses the buses 300 or the like) can be detected.

When evaluation relating to misuse of a data frame is performed on the basis of reception intervals between authorized data frames whose IDs are 0x100 periodically transmitted by the automatic parking ECU 200*a* (reception intervals between data frames having the same ID), for example, an authorized data frame can be determined to be unauthorized as a result of transmission of an unauthorized data frame whose ID is 0x100 performed by an attacker. This is because, for example, if a plurality of data frames are received in a time frame (a range based on the reception interval) in which data frames are determined to be authorized and one of the plurality of data frames is an unauthorized data frame transmitted by an attacker, the data frame transmitted by the attacker can serve as a reference for evaluation based on a next reception interval.

On the other hand, because, in the vehicle network system 10, evaluation relating to misuse of a data frame whose ID is 0x100 is performed on the basis of a reception interval from a data frame (reference data frame) whose ID is 0x200, a possibility of determining an authorized data frame to be unauthorized is reduced. For example, it is effective to use a data frame unlikely to be a target of a malicious attack as a reference data frame that serves as a reference for a reception interval. In addition, when a plurality of misuse detection rules are provided and comprehensive evaluation (a determination whether data frames are unauthorized or the like) is performed on the basis of reception intervals between a plurality of reference data frames and target data frames in order to perform evaluation relating to misuse of target data frames having a certain ID, the evaluation relating to misuse of the target data frames can be performed more accurately.

Second Embodiment

A vehicle network system 11 obtained by partially modifying the vehicle network system 10 described in the first embodiment will be described hereinafter.

The vehicle network system 11 according to the present embodiment uses a misuse detection method in which a data frame that serves as a reference for a reception interval for a data frame subjected to misuse detection is switched. First, a determination whether a data frame is unauthorized is made on the basis of a reception interval between data frames having the same ID, and if it is determined that the data frame is unauthorized, another determination whether the data frame is unauthorized is made on the basis of a reception interval based on a data frame having another ID with which misuse has not been detected.

2.1 Overall Configuration of Vehicle Network System 11

Figure 11:
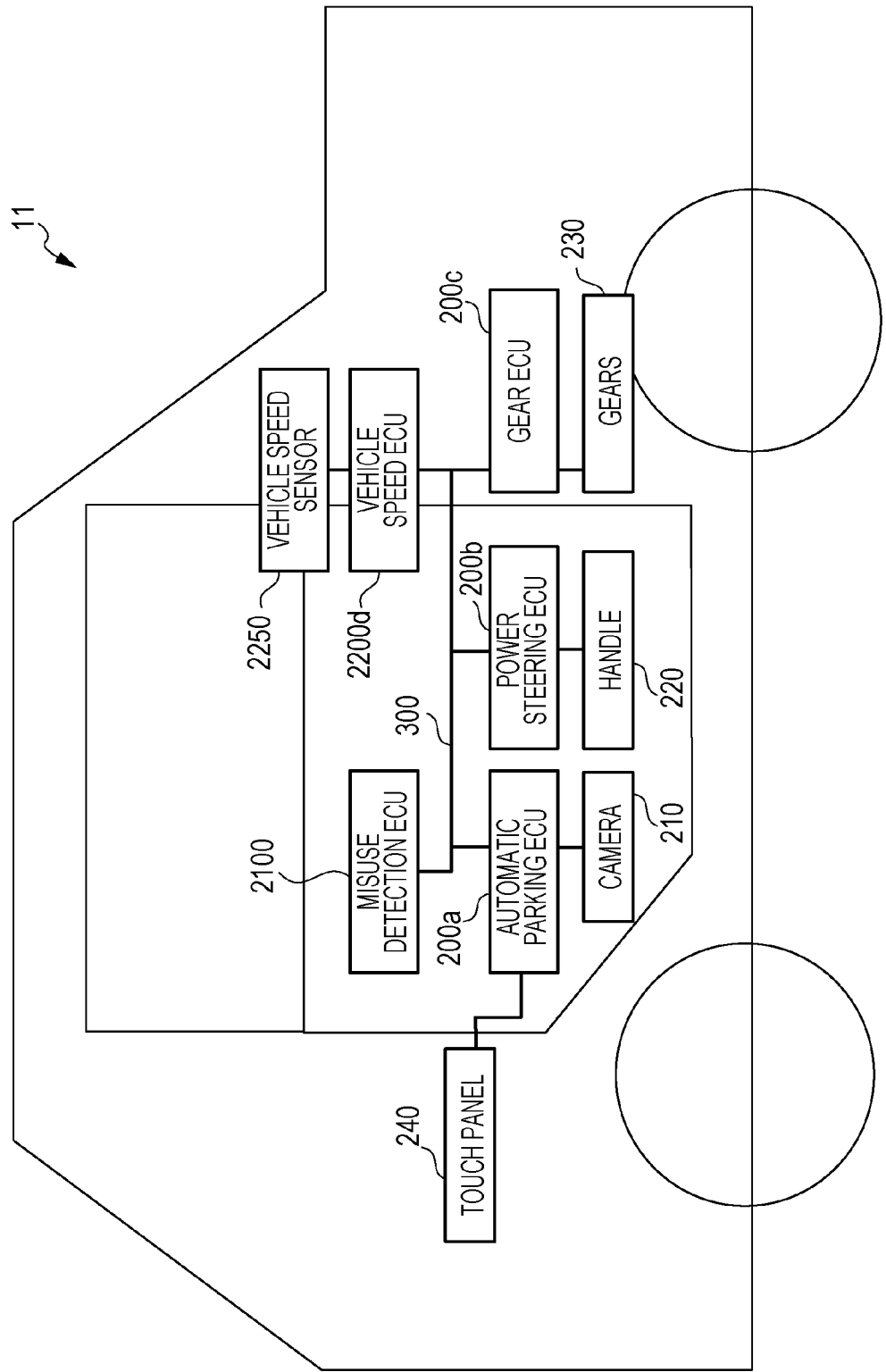
FIG. 11 is a diagram illustrating the overall configuration of a vehicle network system according to a second embodiment.

FIG. 11 is a diagram illustrating the overall configuration of the vehicle network system 11 according to the present embodiment.

As illustrated in FIG. 11, the vehicle network system 11 is configured by including buses 300 and various nodes connected to the buses 300 including a misuse detection ECU 2100 and ECUs connected to the various devices, such as an ECU (automatic parking ECU) 200a, an ECU (power steering ECU) 200b, an ECU (gear ECU) 200c, and an ECU (vehicle speed ECU) 2200d. In the present embodiment, components having the same functions as in the first embodiment are given the same reference numerals, and description thereof is omitted. In addition, the vehicle network system 11 is the same as the vehicle network system 10 unless otherwise specified in the present embodiment.

The vehicle speed ECU 2200d is connected to the buses 300 and to a vehicle speed sensor 2250. The vehicle speed ECU 2200d has the same configuration as the automatic parking ECU 200a (refer to FIG. 7). An external device input/output portion 254 of the vehicle speed ECU 2200d, however, instructs, on the basis of a signal transmitted from the vehicle speed sensor 2250, a frame generation portion 253 to generate a data frame indicating a current speed of the vehicle. As a result, the vehicle speed ECU 2200d periodically transmits data frames indicating the current speed of the vehicle to the buses 300.

The misuse detection ECU 2100 is a kind of ECU connected to the buses 300 and has a function of performing a misuse detection process in which data frames flowing through the buses 300 are monitored and whether an unauthorized frame is flowing is determined.

2.2 Configuration of Misuse Detection ECU 2100

Figures 12, 13:
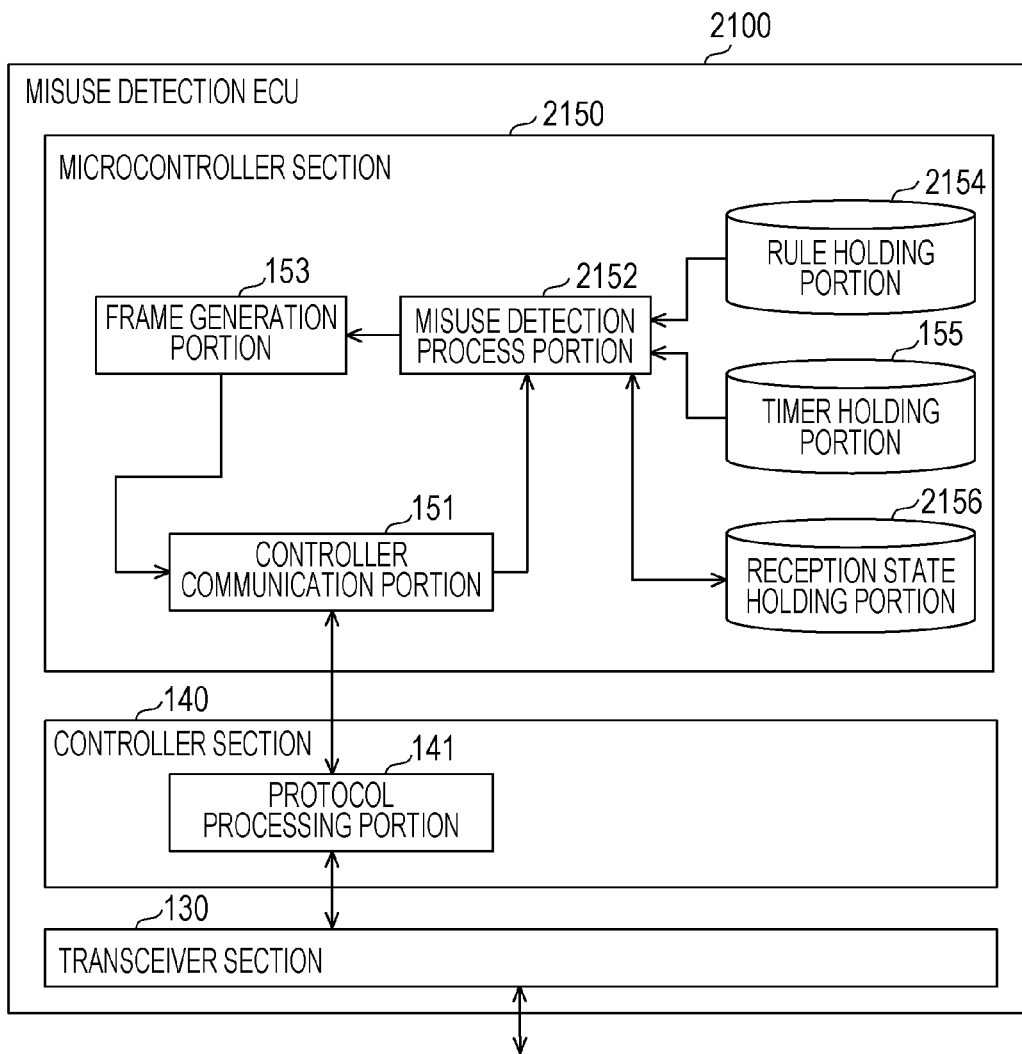
FIG. 12 is a configuration diagram of a misuse detection ECU according to the second embodiment.
FIG. 13 is a diagram illustrating an example of rule information held by a rule holding portion in the misuse detection ECU according to the second embodiment.

FIG. 12 is a configuration diagram of the misuse detection ECU 2100. The misuse detection ECU 2100 is configured by including a transceiver section 130, a controller section 140, and a microcontroller section 2150. Components having the same functions as in the first embodiment are given the same reference numerals, and description thereof is omitted.

The microcontroller section 2150 is a semiconductor integrated circuit that includes a processor which executes a program and a memory and that communicates signals with the controller section 140. The microcontroller section 2150 includes a controller communication portion 151, a frame generation portion 153, a misuse detection process portion 2152, a rule holding portion 2154, a timer holding portion 155, and a reception state holding portion 2156 as components achieved by the processor that executes a program, the memory, and the like.

The controller communication portion 151 transmits a data frame received from the controller section 140 to the misuse detection process portion 2152.

The misuse detection process portion 2152 performs the misuse detection process on a data frame transmitted from the controller communication portion 151. The misuse detection process portion 2152 determines, in the misuse detection process, whether a currently received data frame is unauthorized by referring to rule information indicating a misuse detection rule stored in the rule holding portion 2154, information regarding a current timing stored in the timer holding portion 155, and reception state information indicating past reception states of data frames and the like stored in the reception state holding portion 2156.

If an ID (message ID) of a data frame that is being received is specified as a target of the misuse detection rule in the rule information stored in the rule holding portion 154, the misuse detection process portion 2152 checks, as the misuse detection process, whether its reception timing falls within a range determined by a reception interval from a reception timing of another data frame that serves as a reference for the reception interval and margins. If the reception timing of the received data frame falls within the range based on the reception interval and the margins indicated by the rule information, the received data frame is authorized, and if not, the received data frame is unauthorized. The range is an appropriate time frame relating to reception and will be referred to as a "reception appropriate time frame". It is to be noted that if it is determined that a received data frame is unauthorized, the misuse detection process portion 2152 can transmit information regarding the unauthorized data frame to the frame generation portion 153 in order to notify the ECUs of occurrence of misuse. If detecting an unauthorized data frame, the misuse detection process portion 2152 may count and record an accumulated number of times of detection of misuse for each of IDs of data frames and use the record for a comprehensive determination of misuse for each of the IDs of data frames. Alternatively, the misuse detection process portion 2152 may record log information regarding unauthorized data frames (e.g., IDs and other pieces of information regarding the unauthorized data frames, reception times, and the like) in a recording medium (storage medium) or perform control for reporting misuse (display, transmission of information to a server apparatus located outside the vehicle, or the like).

The rule holding portion 2154 holds the rule information (refer to FIG. 13) indicating the misuse detection rule, which is a rule about a communication interval (reception interval) between data frames to be referred to by the misuse detection process portion 2152. The misuse detection process portion 2152 identifies a reception appropriate time frame on the basis of the misuse detection rule and determines whether a data frame subjected to misuse detection is unauthorized on the basis of whether the data frame falls within the reception appropriate time frame. The misuse detection process portion 2152 identifies the reception appropriate time frame by referring to the reception state information stored in the reception state holding portion 2156.

The reception state holding portion 2156 holds the reception state information (refer to FIG. 14). That is, the reception state holding portion 2156 holds a reception timing of a data frame received in the past for each of the IDs of data frames. In addition, for the misuse detection process, the reception state holding portion 2156 refers to the timer holding portion 155 to obtain the current timing for a timing at which a data frame (a data frame received in a reception appropriate time frame) that satisfies the misuse detection rule relating to a reception interval stored in the rule holding portion 2154 has been received and temporarily holds the timing as a next reception timing candidate. In addition, the reception state holding portion 2156 holds a misuse occurrence state indicating whether misuse has occurred for each of the IDs of data frames. If a next reception timing candidate is set to a state in which there is no candidate each time an end of a reception appropriate time frame comes, and if a plurality of data frames are received in a reception appropriate time frame for which a timing value has already been held as a next reception timing candidate, for example, it can be determined that misuse has occurred, and the misuse occurrence state can be updated. In addition, the reception state holding portion 2156 holds information regarding a previous reception interval from a reference data frame for each of IDs of reference data frames. The reception state information held by the reception state holding portion 2156 is referred to or updated by the misuse detection process portion 2152 and used in a determination whether a currently received data frame is unauthorized.

2.3 Misuse Detection Rule

FIG. 13 is a diagram illustrating an example of the rule information indicating the misuse detection rule held by the rule holding portion 2154. In the example illustrated in the figure, reception intervals and margins specified for combinations of data frames each having one of a plurality of IDs are illustrated whereas the rule information illustrated in FIG. 5 in the first embodiment indicates only a single reception interval.

The rule information illustrated in FIG. 13 indicates that, for example, a reception interval between a data frame whose ID is 0x100 and another data frame whose ID is 0x100 is 50 ms, that is, a reception interval between data frames having the same ID is 50 ms. In the case of data frames whose IDs are 0x100, a reception appropriate time frame extends from 47 ms, which is obtained by adding the reception interval (50 ms) to a reception timing of a previous data frame and subtracting a value of a margin, to 53 ms, which is obtained by adding the value of the margin. If a data frame is received in the reception appropriate time frame, the received data frame is basically determined to be authorized. If a plurality of data frames are received in the reception appropriate time frame, however, it is determined that an unauthorized data frame has been transmitted.

In addition, the rule information illustrated in FIG. 13 indicates that when data frames whose IDs are 0x100 are subjected to misuse detection (target data frames), a reception interval taken until a target data frame is received after a reference data frame, which is a data frame whose ID is 0x200, is received is 25 ms. Similarly, a reception appropriate time frame for a target data frame whose ID is 0x100 is 22 ms to 28 ms after a reference data frame, whose ID is 0x200, is received.

In addition, in the rule information illustrated in FIG. 13, "+2" indicates that when data frames whose IDs are 0x100 are subjected to misuse detection (target data frames), a reception interval taken until a target data frame is received after a reference data frame, which is a data frame whose ID is 0x300, is received increases by 2 ms from a previous reception interval. That is, the reception interval changes in each reception operation, and, in this example, a result obtained by adding 2 ms to a previous reception interval is determined as a current reception interval. If an interval taken until a data frame whose ID is 0x100 is received after a data frame whose ID is 0x300 is received is 10 ms, for example, a reception appropriate time frame for a next data frame whose ID is 0x100 is calculated as 9 ms to 15 ms, which is obtained by including margins of ±3 ms in 12 ms, which is obtained by adding 2 ms to 10 ms, after a reception timing of a data frame whose ID is 0x300. If the obtained range of the reception interval of 9 ms to 15 ms becomes smaller than 0 or larger than an interval specified for two reference data frames (48 ms in the case of data frames whose IDs are 0x300), the range of the reception interval is normalized in such a way as to fall within a range of 0 to the specified reception interval. As a result of the normalization, the range of the reception interval is adjusted in such a way as to serve as a reception interval for a reference data frame received immediately before a data frame whose ID is 0x100. If a reception interval is to be checked with a data frame whose ID is 0x300 determined as a reference data frame in order to perform misuse detection on a data frame whose ID is 0x100, and if a previous reception interval is 47 ms, for example, a current reception interval is 49 ms, which is obtained by adding 2 ms to 47 ms. This value, however, undesirably exceeds 48 ms, which is an interval between data frames whose IDs are 0x300. The current reception interval, therefore, is 1 ms, which is obtained by subtracting 48 from 49. Since the margins of ±3 are allowed, a resultant reception appropriate time frame is 0 to 4 ms and 46 ms to 48 ms after a reception timing of a data frame of 0x300.

The rule information similarly specifies reception intervals and margins used for misuse detection at a time when data frames whose IDs are 0x200 or data frames whose IDs are 0x300 are a target of the misuse detection.

2.4 Reception State Information

FIG. 14 is a diagram illustrating an example of the reception state information stored in the reception state holding portion 2156. In the reception state information, a reception timing of a data frame received by the misuse detection ECU 2100 in the past and the like are recorded for each of the IDs of data frames.

The example illustrated in FIG. 14 indicates that a previous reception timing of a data frame whose ID is 0x100 is 151 ms, a next reception timing candidate is 201 ms, and misuse has occurred because, for example, a plurality of data frames have been received in a reception appropriate time frame (that is, the misuse occurrence state is "misused"). In addition, the example illustrated in FIG. 14 indicates that, as previous reception intervals, a reception interval between data frames whose IDs are 0x100 has been 51 ms, a reception interval between a data frame whose ID is 0x200 and a data frame whose ID is 0x100 has been 25 ms, and a reception interval between a data frame whose ID is 0x300 and a data frame whose ID is 0x100 has been 10 ms.

Similarly, reception timings, next reception timing candidates, misuse occurrence states, and previous reception intervals are held for data frames whose IDs are 0x200 and data frames whose IDs are 0x300. When the next reception timing candidate is "none", a data frame having an applicable ID has not yet been received in a reception appropriate time frame. In addition, after a reception appropriate time frame ends, the misuse detection process portion 2152 updates a reception timing using a value of the next reception timing candidate in the reception state information and then updates the next reception timing candidate to "none".

2.5 Example of Data Frame

FIG. 15 is a diagram illustrating an example of an ID (message ID) and a data field (data) of a data frame transmitted by the vehicle speed ECU 2200*d*.

As illustrated in the figure, the message ID of the data frame transmitted by the vehicle speed ECU 2200*d* is "0x300", and a DLC is "1" (one byte). The data field includes a value indicating vehicle speed, and the example illustrated in FIG. 15 indicates that the vehicle speed is 16 (0x10) km/h.

Figure 16:
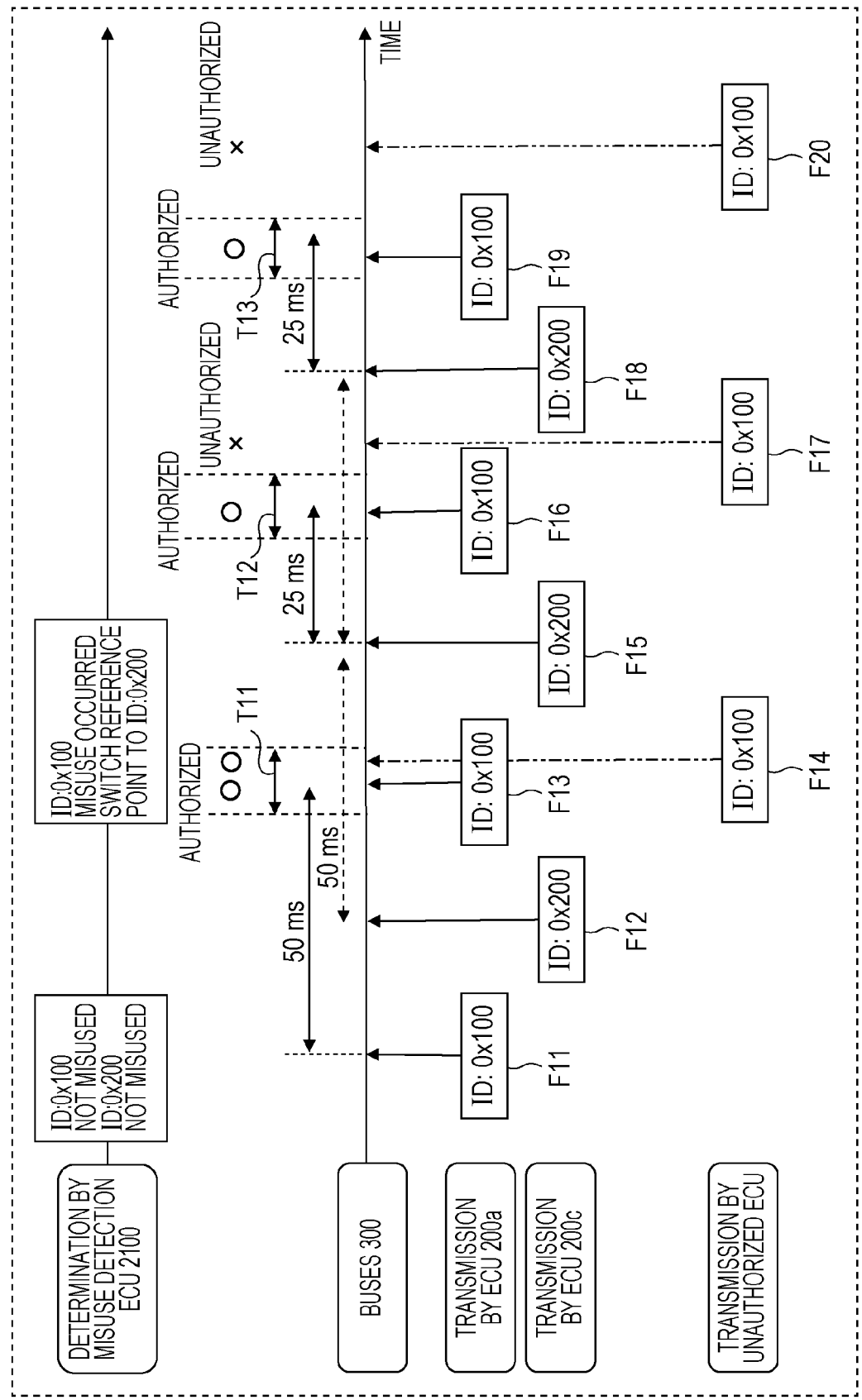
FIG. 16 is a diagram illustrating an example of a misuse detection operation performed by the misuse detection ECU on data frames according to the second embodiment.

2.6 Example of Misuse Detection Operation Performed by Misuse Detection ECU 2100 on Data Frames FIG. 16 is a diagram illustrating an example in which the misuse detection ECU 2100 receives data frames sequentially appearing on the buses 300 and performs misuse detection.

In FIG. 16, a situation is illustrated in which data frames F11, F13, F16, and F19 whose IDs are 0x100 periodically transmitted by the automatic parking ECU 200*a* and data frames F12, F15, and F18 whose IDs are 0x200 periodically transmitted by the gear ECU 200*c* sequentially appear on the buses 300. In addition, in FIG. 16, an attacker (unauthorized ECU) that can access the buses 300 periodically transmits unauthorized data frames F14, F17, and F20 whose IDs are 0x100 to the buses 300 in order to improperly control the handle 220. In this example, the misuse detection ECU 2100 performs evaluation relating to misuse on the data frames whose IDs are 0x100 (more specifically, determinations whether the data frames are unauthorized) as misuse detection (check). FIG. 16 illustrates an example in which, when performing evaluation relating to misuse on the data frames whose IDs are 0x100, the misuse detection ECU 2100 switches, in accordance with a condition of occurrence of misuse (misuse occurrence state), a data frame that serves as a reference for a reception interval to a data frame having an ID with which misuse has not occurred. Although not illustrated in FIG. 16, the misuse detection ECU 2100 can perform misuse detection (evaluation relating to misuse) on the data frames whose IDs are not 0x100. It is assumed that, in the reception state information held by the reception state holding portion 2156, the misuse occurrence state corresponding to each ID is "none" at a beginning.

First, when misuse has not occurred (that is, when the misuse occurrence state of each ID is "none" in the reception state information), the misuse detection ECU 2100 detects misuse of the data frames whose IDs are 0x100, which are subjected to the misuse detection, on the basis of a reception interval based on a reception timing of a data frame having the same ID as the targets (0x100). It is to be noted that, in this example, the order of selection of an ID of a data frame that serves as a reference data frame is 0x100, x200, and 0x300.

The misuse detection ECU 2100 holds a timing at which the data frame F11, whose ID is 0x100, has been received as a reception timing in the reception state information.

Next, the misuse detection ECU 2100 receives the second data frame F13 whose ID is 0x100 transmitted from the automatic parking ECU 200*a*. The misuse detection ECU 2100 identifies, on the basis of the misuse detection rule (refer to FIG. 13) indicated by the rule information, a range of 47 ms to 53 ms after the timing at which the data frame F11, whose ID is 0x100, has been received as a reception appropriate time frame T11. Because a reception timing of the data frame F13 falls within the reception appropriate time frame T11, the misuse detection ECU 2100 determines that the data frame F13 is authorized (not unauthorized).

At this time, the third data frame F14 whose ID is 0x100 is transmitted by the attacker. Because a reception timing of the data frame F14 falls within the reception appropriate time frame T11, the data frame F14 can be regarded as authorized. Since the data frame F13 having the same ID, namely 0x100, has already been received within the reception appropriate time frame T11, however, either the data frame F13 or the data frame F14 is unauthorized. The misuse detection ECU 2100, therefore, determines that misuse has occurred with data frames having the ID of 0x100, and updates the misuse occurrence state of the data frame whose ID is 0x100 to "misused" in the reception state information held by the reception state holding portion 2156. Thereafter, the misuse detection ECU 2100 selects data frames whose IDs are 0x200, which follow data frames whose IDs are 0x100 in the order of selection, instead of the data frames whose IDs are 0x100. As a result, reception appropriate time frames are no longer determined on the basis of data frames having the ID of 0x100, which might be misused, and a possibility of erroneously detecting a data frame as an unauthorized data frame is reduced.

The misuse detection ECU 2100 holds a timing at which the data frame F15, whose ID is 0x200, has been received as a reception timing in the reception state information.

Next, the misuse detection ECU 2100 receives the fourth data frame F16 whose ID is 0x100 transmitted from the automatic parking ECU 200*a*. The misuse detection ECU 2100 identifies, on the basis of the misuse detection rule (refer to FIG. 13), a range of 22 ms to 28 ms after the timing at which the data frame F15, whose ID is 0x200, has been received as a reception appropriate time frame T12.

Because a reception timing of the data frame F16 falls within the reception appropriate time frame T12, the misuse detection ECU 2100 determines that the data frame F16 is authorized.

Next, the misuse detection ECU 2100 receives the fifth data frame F17 whose ID is 0x100 transmitted from the attacker. Because a reception timing of the data frame F17 falls outside the reception appropriate time frame T12, the misuse detection ECU 2100 determines that the data frame F17 is unauthorized.

The misuse detection ECU 2100 then similarly identifies a reception appropriate time frame T13 on the basis of a reception timing of the data frame F18, whose ID is 0x200, and determines that the data frame F19, which has been transmitted from the automatic parking ECU 200*a*, received in the reception appropriate time frame T13 is authorized and that the data frame F20, which has been transmitted from the attacker, that has not been received in the reception appropriate time frame T13 is unauthorized.

Figure 17:
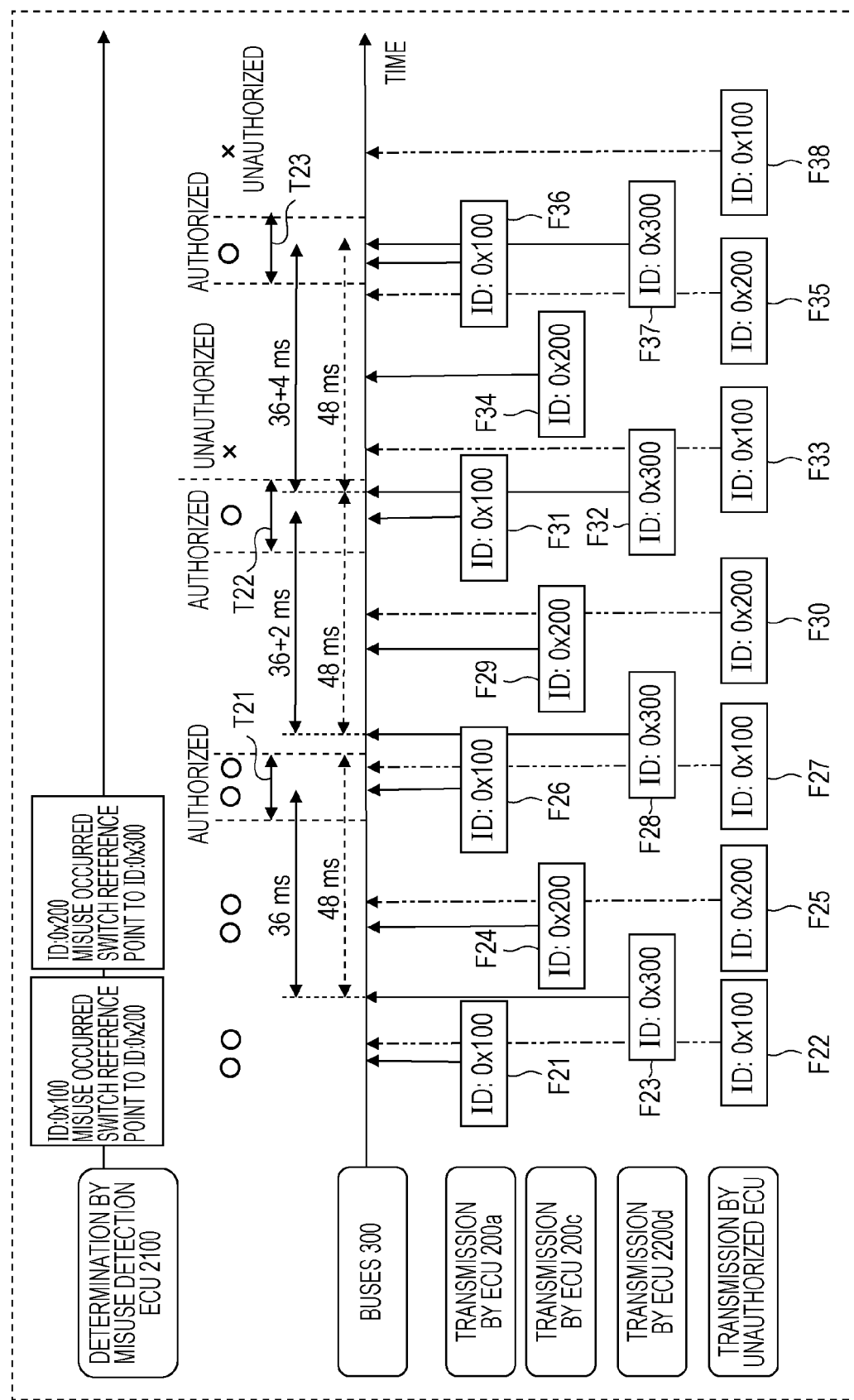
FIG. 17 is a diagram illustrating another example of the misuse detection operation performed by the misuse detection ECU on data frames according to the second embodiment.

2.7 Second Example of Misuse Detection Operation Performed by Misuse Detection ECU 2100 on Data Frames FIG. 17 is a diagram illustrating another example in which the misuse detection ECU 2100 receives data frames sequentially appearing on the buses 300 and performs misuse detection.

In FIG. 17, a situation is illustrated in which data frames F21, F26, F31, and F36 whose IDs are 0x100 periodically transmitted by the automatic parking ECU 200*a*, data frames F24, F29, and F34 whose IDs are 0x200 periodically transmitted by the gear ECU 200*c*, and data frames F23, F28, F32, and F37 whose IDs are 0x300 periodically transmitted by the vehicle speed ECU 2200*d* sequentially appear on the buses 300. In addition, in FIG. 17, a situation is illustrated in which an attacker (unauthorized ECU) that can access the buses 300 periodically transmits unauthorized data frames F22, F27, F33, and F38 whose IDs are 0x100 and unauthorized data frames F25, F30, and F35 whose IDs are 0x200 to the buses 300 in order to improperly control the handle 220 and the like. In this example, the misuse detection ECU 2100 performs evaluation relating to misuse on the data frames whose IDs are 0x100 (more specifically, determinations whether the data frames are unauthorized) as misuse detection. FIG. 17 illustrates an example in which, when performing evaluation relating to misuse of the data frames whose IDs are 0x100, the misuse detection ECU 2100 switches, in accordance with a condition of occurrence of misuse, a data frame that serves as a reference for a reception interval to a data frame having an ID with which misuse has not occurred. Although not illustrated in FIG. 17, the misuse detection ECU 2100 can perform misuse detection on the data frames whose IDs are not 0x100.

It is assumed that, in the reception state information held by the reception state holding portion 2156, the misuse occurrence state corresponding to each ID is "none" at a beginning.

After receiving the first and second data frames F21 and F22 whose IDs are 0x100, the misuse detection ECU 2100 determines that misuse has occurred with the data frames whose IDs are 0x100 since a plurality of data frames has been received in a reception appropriate time frame, and updates the misuse occurrence state of the data frame whose ID is 0x100 to "misused" in the reception state information held by the reception state holding portion 2156. As a result, data frames whose IDs are 0x100 will no longer be used as data frames that serve as references for determining reception appropriate time frames relating to reception intervals. In this example, the order of selection of an ID of a data frame that serves as a reference is 0x100, 0x200, and 0x300. Furthermore, after receiving the first and second data frames F24 and F25 whose IDs are 0x200, the misuse detection ECU 2100 determines that misuse has occurred with the data frames whose IDs are 0x200 since a plurality of data frames has been received in a reception appropriate time frame, and updates the misuse occurrence state of the data frame whose ID is 0x200 to "misused" in the reception state information held by the reception state holding portion 2156. As a result, data frames whose IDs are 0x200 will no longer be used as data frames that serve as references for determining reception appropriate time frames relating to reception intervals, and data frames whose IDs are 0x300 are selected as references.

The misuse detection ECU 2100 identifies a reception appropriate time frame T21 on the basis of a reception timing of the data frame F23, whose ID is 0x300, and determines whether the third data frame F26 whose ID is 0x100 is unauthorized on the basis of whether the data frame F26 has been received in the reception appropriate time frame T21. Because the data frame F26 has been received in the reception appropriate time frame T21, the data frame F26 is determined to be authorized.

The misuse detection ECU 2100 then similarly identifies a reception appropriate time frame T22 on the basis of a reception timing of the data frame F28, whose ID is 0x300, and determines that the data frame F31, whose ID is 0x100, received in the reception appropriate time frame T22 is authorized and that the data frame F33 that has not been received in the reception appropriate time frame T22 is unauthorized. In addition, the misuse detection ECU 2100 identifies a reception appropriate time frame T23 on the basis of a reception timing of the data frame F32, whose ID is 0x300, and determines that the data frame F36, whose ID is 0x100, received in the reception appropriate time frame T23 is authorized and that the data frame F38 that has not been received in the reception appropriate time frame T23 is unauthorized. It is to be noted that reception intervals between the data frames F23, F28, and F32, whose IDs are 0x300 and which serve as references for identifying reception appropriate time frames, and the data frames, whose IDs are 0x100 and which are subjected to misuse detection, change (increase by 2 ms from 36 ms) on the basis of the misuse detection rule (refer to FIG. 13) each time a data frame whose ID is 0x100 is received.

2.8 Misuse Detection Process Performed by Misuse Detection ECU 2100

A process performed by the misuse detection ECU 2100 as a misuse detection process when receiving a data frame will be described hereinafter with reference to a flowchart of FIG. 18.

The misuse detection ECU 2100 receives a data frame from the buses 300 (step S2101).

The misuse detection ECU 2100 checks, on the basis of the rule information (refer to FIG. 13) held by the rule holding portion 2154, whether a misuse detection rule relating to an ID of the received data frame is specified (step S2102). If a misuse detection rule relating to the ID of the received data frame is not specified, the misuse detection ECU 2100 ends the process corresponding to the reception of one data frame.

If checking in step S2102 that a misuse detection rule relating to the ID of the received data frame is specified, the misuse detection ECU 2100 updates a reception timing and a next reception timing candidate in the reception state information (refer to FIG. 14) (step S2103). More specifically, in step S2103, the misuse detection ECU 2100 sets a value of the next reception timing candidate to the reception timing in the reception state information (that is, updates the reception timing with the value of the next reception timing candidate) and updates the next reception timing candidate to "none" for, among all IDs whose next reception timing candidates are not "none" in the reception state information, an ID with which the current timing obtained from the timer holding portion 155 indicates that an end of a reception appropriate time frame corresponding to the ID has come. In addition, in step S2103, if there is no ID for which the current timing obtained from the timer holding portion 155 indicates that an end of a reception appropriate time frame corresponding to the ID has come among all the IDs whose next reception timing candidates are not "none" in the reception state information, the misuse detection ECU 2100 does nothing.

After step S2103, the misuse detection ECU 2100 selects an ID with which misuse has not yet occurred (an ID whose misuse occurrence state is "not misused" in the reception state information) as an ID of a data frame that serves as a reference for identifying a reception appropriate time frame (step S2104). The selection is performed, for example, on the basis of a selection criterion (selection order or the like) indicating that a smaller ID value of a data frame relating to the misuse detection rule indicated by the rule information (refer to FIG. 13) takes priority. In this case, IDs can be selected in order of 0x100, 0x200, and 0x300.

The misuse detection ECU 2100 refers to the reception state information held by the reception state holding portion 2156 to obtain a reception timing of a data frame having the selected ID. The misuse detection ECU 2100 then refers to the misuse detection rule indicated by the rule information held by the rule holding portion 2154 and identifies a reception appropriate time frame through calculation according to a reception interval and margins determined from the reception timing of the data frame having the selected ID that serves as a reference and the ID of the received data frame (step S2105).

Next, the misuse detection ECU 2100 determines whether the timing at which the data frame has been received (that is, the current timing obtained from the timer holding portion 155) falls within the reception appropriate time frame. If the timing at which the data frame has been received does not fall within the reception appropriate time frame, the misuse detection ECU 2100 determines that the received data frame is unauthorized (step S2107), updates a misuse occurrence state corresponding to the ID of the data frame to "misused" in the reception state information (step S2108), and ends the process.

If determining in step S2106 that the timing at which the data frame has been received falls within the reception appropriate time frame, the misuse detection ECU 2100 checks whether the next reception timing candidate corresponding to the ID of the received data frame is "none" in the reception state information (step S2109). If the next reception timing candidate is not "none", the misuse detection ECU 2100 determines that the ID of the received data frame is unauthorized (step S2107), updates the misuse occurrence state corresponding to the ID of the data frame to "misused" (step S2108), and ends the process. When the next reception timing candidate is not "none", either the received data frame or a data frame received immediately before the foregoing data frame is unauthorized. It is to be noted that, in a determination whether a data frame is unauthorized, occurrence of misuse of each data frame and occurrence of misuse of one or more data frames having the same ID may or may not be distinguished.

In any case, however, the misuse detection ECU 2100 updates a misuse occurrence state to "none" in the reception state information and no longer uses data frames having the same ID as the data frame relating to the misuse as references for identifying reception appropriate time frames.

If checking in step S2109 that the next reception timing candidate corresponding to the ID of the received data frame is "none" in the reception state information, the misuse detection ECU 2100 determines that the received data frame is authorized, sets the current timing to the next reception timing candidate corresponding to the ID of the data frame in the reception state information (step S2110), and ends the process. That is, in step S2110, the misuse detection ECU 2100 updates the next reception timing candidate with the current timing obtained from the timer holding portion 155 and ends the process corresponding to the reception of one data frame.

The misuse detection process performed by the misuse detection ECU 2100 thus includes a reception step (step S2101) of receiving a data frame transmitted through the buses 300. In addition, the misuse detection process includes an initial detection step (e.g., steps S2102 to S2106) of evaluating whether a data frame is a target data frame, which is a data frame having a first identifier (e.g., an ID of 0x100), in accordance with an interval between reception timings of two target data frames as misuse detection for a target data frame. In this initial detection step, if, as misuse detection for a target data frame, a reception timing of the target data frame falls outside an appropriate time frame, which is predetermined on the basis of a reception timing of a target data frame that precedes the reception timing, or if the reception timing of the target data frame falls within the reception appropriate time frame and another target data frame has been received in the reception appropriate time frame, it is determined that the target data frame is unauthorized (steps S2109, S2107, and S2108). The misuse detection in the initial detection step is then stopped after it is evaluated in the initial detection step that the target data frame is unauthorized, and misuse detection starts in a detection step in which a reference for the reception appropriate time frame has been switched. In the detection step, evaluation (a determination whether a data frame is unauthorized or the like) is performed (e.g., steps S2102 to S2110 or the like) in accordance with a reception timing of a reference data frame, which is a data frame having a second identifier (e.g., an ID of 0x200) different from the first identifier, and a reception timing of a target data frame on the basis of a certain rule (that is, a misuse detection rule indicated by rule information) specifying a reception interval between the reference data frame and the target data frame. In addition, the misuse detection process includes a reference detection step (e.g., step S2106, S2109, or the like) of performing misuse detection on the reference data frame. In the misuse detection process, if it is detected in the reference detection step that the reference data frame is unauthorized, the misuse detection in the detection step is stopped, and misuse detection starts in a subsequent detection step. In the subsequent detection step, as the misuse detection for the target data frame, evaluation is performed (e.g., steps S2102 to S2107 or the like) in accordance with a reception timing of another reference data frame, which is a data frame having a third identifier (e.g., an ID of 0x300) different from the first identifier or the second identifier, and the reception timing of the target data frame on the basis of a rule (misuse detection rule) specifying a reception interval between the other reference data frame and the target data frame. In addition, the misuse detection process can include a recording step of recording a result of the evaluation in the detection step in a storage medium.

2.9 Effects Produced by Second Embodiment

In the vehicle network system 11 according to the second embodiment, the misuse detection ECU 2100 performs evaluation relating to misuse of a data frame (a determination whether a data frame is unauthorized or the like) on the basis of a reception interval between the data frame subjected to the evaluation and a data frame that serves as a reference and with which occurrence of misuse has not yet been detected. After misuse occurs with the data frame that serves as a reference, another frame is selected and used as a reference. That is, the misuse detection ECU 2100 makes a determination relating to misuse of a data frame or the like on the basis of a reception interval between a data frame with which misuse has not occurred and a data frame subjected to the misuse detection.

As a result, transmission of an unauthorized data frame performed by an attacker (an unauthorized ECU that accesses the buses 300 or the like) can be detected, and a possibility of determining an authorized data frame to be unauthorized is reduced.

Other Embodiments

The first and second embodiments have been described above as examples of the techniques according to the present disclosure. The techniques according to the present disclosure, however, are not limited to these and may be applied to embodiments obtained by appropriately making modifications, replacement, addition, omission, or the like to the first and second embodiments. For example, the following modifications are also included in embodiments of the present disclosure.

(1) Although the misuse detection process portions 152 and 2152 have been described as components of the misuse detection ECUs 100 and 2100, respectively, in the above embodiments, the misuse detection process portions 152 and 2152 may be components of other ECUs, instead. Any ECU may perform misuse detection (evaluation relating to misuse or the like) on a data frame.

(2) Although a data frame according to the CAN protocol is described in the standard ID format in the above embodiments, an extended ID format may be used, instead. In the case of the extended ID format, an ID of a data frame is indicated by a total of 29 bits including a base ID at an ID position in the standard ID format and an extended ID.

(3) The misuse detection ECU 100 or 2100 in the above embodiments may perform misuse detection on a data frame after reception of the data frame is completed or while the data frame is being received (more specifically, at an arbitrary point of time after an ID field is received).

(4) Although the misuse detection ECU 100 or 2100 holds a reception timing of a data frame and checks that a reception interval with margins has ended on the basis of the reception timing in the above embodiments, the misuse detection ECUs 100 and 2100 need not necessarily hold a reception timing of a data frame. For example, the misuse detection ECU 100 or 2100 may check that a reception interval has ended by setting the reception interval to a countdown timer when a data frame is received, instead.

(5) Although the misuse detection ECU 100 or 2100 notifies the other ECUs of occurrence of misuse, count and record an accumulated number of times of detection of misuse, record log information, or report misuse, for example, if it is detected that a data frame is unauthorized in the above embodiments, any other type of processing may be performed, instead. For example, if it is detected that a data frame is unauthorized while the data frame is being received, the misuse detection ECU 100 or 2100 may transmit an error frame to the buses 300 in order to invalidate the unauthorized data frame and prevent the ECUs from processing the unauthorized data frame as usual.

(6) Although an example in which a determination whether a data frame is unauthorized (that is, an alternative determination) is made as evaluation relating to misuse for the data frame subjected to misuse detection has been described in the above embodiments, the evaluation relating to misuse is not limited to a determination. For example, evaluation in which a likelihood (e.g., probability) of misuse is calculated may be performed, instead. The calculation of the likelihood that a data frame is unauthorized can be achieved, for example, by the following method. Whereas data frames (or IDs of the data frames) that serve as references for calculating reception appropriate time frames are sequentially selected in the misuse detection process in the second embodiment, reception appropriate time frames in this case are not selected but obtained using data frames of all IDs included in the misuse detection rule (refer to FIG. 13). A reception timing of a data frame subjected to misuse detection is then compared with a reception appropriate time frame group, which is obtained by overlapping all the reception appropriate time frames. The misuse detection ECU can evaluate that the likelihood of misuse is low when the reception timing of the data frame subjected to misuse detection is a time at which a degree of overlap between the reception appropriate time frames in the reception appropriate time frame group is high and that the likelihood of misuse is high when the reception timing of the data frame subjected to misuse detection is a time at which the degree of overlap is low or a time outside any of the reception appropriate time frames. This evaluation, for example, is evaluation in which the likelihood of misuse is calculated through a certain calculation based on the misuse detection rule (refer to FIG. 13) as a group of rules specifying reception intervals between data frames of a plurality of IDs and a data frame subjected to misuse detection, reception timings of the data frames, and the reception timing of the data frame subjected to the misuse detection. The content of the certain calculation for calculating the likelihood of misuse can be arbitrarily determined. It is to be noted that an alternative determination whether a data frame is unauthorized may be made by comparing the likelihood of misuse with a threshold. Alternatively, a determination whether a data frame is unauthorized may be made while obtaining reception appropriate time frames using data frames of the plurality of IDs included in the misuse detection rule (refer to FIG. 13) as references, and whether the data frame subjected to misuse detection is unauthorized may be eventually determined by a majority vote, for example, by accumulating results of evaluation whether a reception timing of the data frame subjected to the misuse detection is included in the reception appropriate time frames (that is, results of evaluation whether the data frame is unauthorized). It is to be noted that, in addition to the majority vote, for example, the data frame subjected to the misuse detection may be determined to be unauthorized if the reception timing of the data frame is not included in any of the plurality of reception appropriate time frames.

(7) Although an example in which data frames (that is, IDs of the data frames) that serve as references for identifying reception appropriate time frames are selected in ascending order of an ID value in the misuse detection process has been described in the above embodiments, the order may be determined by another method, instead. For example, IDs with which misuse has not occurred may be selected in descending order of the ID value. Alternatively, data frames may be selected while adding a condition that the ID value be larger or smaller than an ID of a data frame subjected to misuse detection. Alternatively, data frames whose ID values are closer to an ID value of a data frame subjected to misuse detection may be selected first. Alternatively, data frames whose reception intervals specified as reference data frames are closer to a reception interval between data frames subjected to misuse detection may be selected first.

(8) Although an example in which data frames (that is, IDs of the data frames) that serve as references for identifying reception appropriate time frames are selected in descending order of an ID value in the misuse detection process has been described in the above embodiments, the order need not be determined, instead. For example, IDs may be randomly selected, or a selected ID may be regularly changed (e.g, changed to a randomly selected ID). Alternatively, an ID to be selected may be switched in accordance with a current state of a vehicle (a vehicle on which the ECUs are mounted). That is, after a state of the vehicle changes, an ID to be selected may be switched on the basis of a selection criterion in which an ID of a data frame to be selected for each state of the vehicle is predetermined. The state of the vehicle can be a stationary state, a running state, or the like. Various states identified with the sensors and the devices mounted on the vehicle can be used as states of the vehicle. For example, a state in which an ignition key is inserted into an ignition key cylinder, a state in which an engine has started, a gear position state (e.g., parking, neutral, first gear, second gear, or the like), a state of a network load upon the buses 300 or the like, and the like can be used as the states of the vehicle. In addition, the state of the vehicle can be identified on the basis of a change in the content of a data frame flowing through the buses 300, the necessity of misuse detection, or the like.

(9) In the above embodiments, an example has been described in which a reception timing of a data frame received first among data frames received in a reception appropriate time frame is stored as a next reception timing candidate included in the reception state information held by the reception state holding portion 2156 and a value of the next reception timing candidate is set to a reception timing in the reception state information after the reception appropriate time frame ends. This, however, is just an example. As a reception timing included in the reception state information that serves as a reference for a next reception appropriate time frame, for example, a reception timing of a data frame received last among data frames received in a reception appropriate time frame may be set, or a reception timing of a data frame received at a timing closest to when a reception interval indicated by the misuse detection rule ends may be set. It is to be noted that although a misuse occurrence state included in the reception state information becomes "misused" if a plurality of data frames are received in a reception appropriate time frame in the above embodiments, the misuse occurrence state may become "misused" only if a predetermined number of data frames or more are received in a reception appropriate time frame.

(10) Although an example in which a misuse occurrence state included in the reception state information held by the reception state holding portion 2156 does not change once set to "misused" has been described in above embodiments, the misuse occurrence state may be changed to "not misused" under a certain condition, instead. For example, the misuse occurrence state may be changed to "not misused" if it is checked a certain number of times that only one data frame having an applicable ID has been received in a reception appropriate time frame, or the misuse occurrence state may be regularly reset to "not misused".

(11) Although the misuse detection rule indicated by the rule information held by the rule holding portion 154 or 2154 includes rules relating to reception intervals for a plurality of IDs in the above embodiments, rules relating to reception intervals need not be specified for all IDs that can be used for data frames communicated through the buses 300. In addition, the misuse detection rule may include, for data frames of all IDs or some IDs, rules (e.g., restriction of data length, the content of a data field, or the like) that serve as references for evaluation relating to misuse of a data frame (a determination whether a data frame is unauthorized or the like) as well as the rules relating to reception intervals.

(12) In the above embodiments, an example has been described in which a misuse occurrence state included in the reception state information held by the reception state holding portion 2156 is changed to "misused" if a plurality of data frames having an applicable ID are received in a reception appropriate time frame or if a data frame having an applicable ID is received outside a reception appropriate time frame. This is just an example, and, for example, a misuse occurrence state of an applicable ID may be changed to "misused" if it is detected that a data frame that does not comply with a rule other than that about a reception interval has been transmitted, instead.

(13) Although the microcontroller section 150 or 2150 performs the misuse detection process in the above embodiments, the controller section 140 may perform the entirety or a part of the misuse detection process, instead.

(14) Although a reception timing included in the reception state information is not updated until a reception appropriate time frame ends in order to determine whether a data frame is authorized or not on the basis of a reception interval in the above embodiments, the reception timing included in the reception state information may be updated at a timing at which a data frame has been received in a reception appropriate time frame, instead. Alternatively, the reception timing need not be updated each time a data frame is received in a reception appropriate time frame. For example, a reception appropriate time frame may be calculated by holding a number of times of reception and multiplying a reception interval relating to the misuse detection rule indicated by the rule information and the number of times of reception, instead. At this time, the number of times of reception may be reset and the reception timing at this time may be updated at arbitrary timings.

(15) Although an example in which the microcontroller section 150 or the microcontroller section 2150 includes the rule holding portion 154 or 2154, the timer holding portion 155, the reception timing holding portion 156, and the reception state holding portion 2156 has been described in the above embodiments, the controller section 140 may include at least one of the rule holding portion 154 or 2154, the timer holding portion 155, the reception timing holding portion 156, and the reception state holding portion 2156.

(16) Although a reception appropriate time frame extends from a value obtained by subtracting a margin from a reception interval indicated by the rule information held by the rule holding portion 2154 to a value obtained by adding a margin to the reception interval as a method for identifying a reception appropriate time frame in the above embodiments, a reception appropriate time frame is not limited to this. For example, a reception appropriate time frame may be the entirety of a time range that begins with a value obtained by subtracting a margin from the reception interval indicated by the rule information, instead.

(17) In the above embodiments, a data frame flowing through the buses 300 is used as a data frame that serves as a reference for checking a reception interval between the data frame and a data frame subjected to misuse detection, the foregoing data frame having an ID different from an ID of the data frame subjected to misuse detection. The data frame that serves as a reference may be a data frame for control purposes or state notification purposes to be caused to flow through the buses 300, or may be a dummy data frame that has no purposes other than for misuse detection. Dummy data frames are periodically transmitted by one of the ECUs and received by the misuse detection ECU, and need not be received by any ECU other than the misuse detection ECU. The misuse detection ECU can perform misuse detection while identifying a reception appropriate time frame for a data frame having an ID subjected to misuse detection using a reception timing of the dummy data frame as a reference. Alternatively, the misuse detection ECU may use a data frame having an ID different from an ID subjected to misuse detection as a data frame that serves as a reference for the misuse detection, the data frame being transmitted by an ECU that transmits a data frame having the ID subjected to the misuse detection.

(18) Although the misuse detection ECUs and the other ECUs in the above embodiments are, for example, devices including digital circuits, analog circuits, communication circuits, and the like such as processors and memories, the misuse detection ECUs and the other ECUs may include other hardware components such as displays, keyboards, and mice, instead. In addition, instead of achieving the functions in a software manner with the processors that execute control programs stored in the memories, the functions may be achieved by dedicated hardware (digital circuits or the like).

(19) Some or all of the components of each device in the above embodiments may be configured by a single system large scale integration (LSI) circuit. The system LSI circuit is a super-multifunctional LSI circuit fabricated by integrating a plurality of components on a single chip and is specifically a computer system configured by including a microprocessor, a ROM, a RAM, and the like. In the RAM, a computer program is recorded. When the microprocessor operates in accordance with the computer program, the system LSI circuit achieves functions thereof. Alternatively, each of the components configuring each device may be individually achieved as a chip, or some or all of the components may be achieved as a chip. Although a term "system LSI" is used here, a term "IC", "LSI", "super LSI", or "ultra LSI" might be used depending on a degree of integration. In addition, a method for fabricating an integrated circuit is not limited to LSI, and an integrated circuit may be achieved by a dedicated circuit or a multipurpose processor. An field-programmable gate array (FPGA) capable of performing programming or a reconfigurable processor capable of reconfiguring connections and settings of circuit cells inside the LSI circuit may be used after an LSI circuit is fabricated. Furthermore, if a technique for fabricating an integrated circuit that replaces LSI appears as a result of evolution of semiconductor technologies or other derivative technologies, function blocks may be obviously integrated using the technique. Application of a biotechnology is one of such possibilities is.

(20) Some or all of the components of each device may be configured by an IC card or an independent module removably attached to the device. The IC card or the module is a computer system configured by a microprocessor, a ROM, a RAM, and the like. The IC card or the module may include the super-multifunctional LSI circuit. The IC card or the module achieves functions thereof when the microprocessor operates in accordance with a computer program. The IC card or the module may be tamper-resistant.

(21) The order of execution of the procedures of the various processes described in the above embodiments (e.g., the processing procedures illustrated in FIGS. 10 and 18 and the like) need not necessarily be limited to that illustrated. The order of execution may be switched, a plurality of procedures may be performed in parallel with one another, or a part of a procedure may be omitted, insofar as the scope of the invention is not deviated from.

Figure 18:
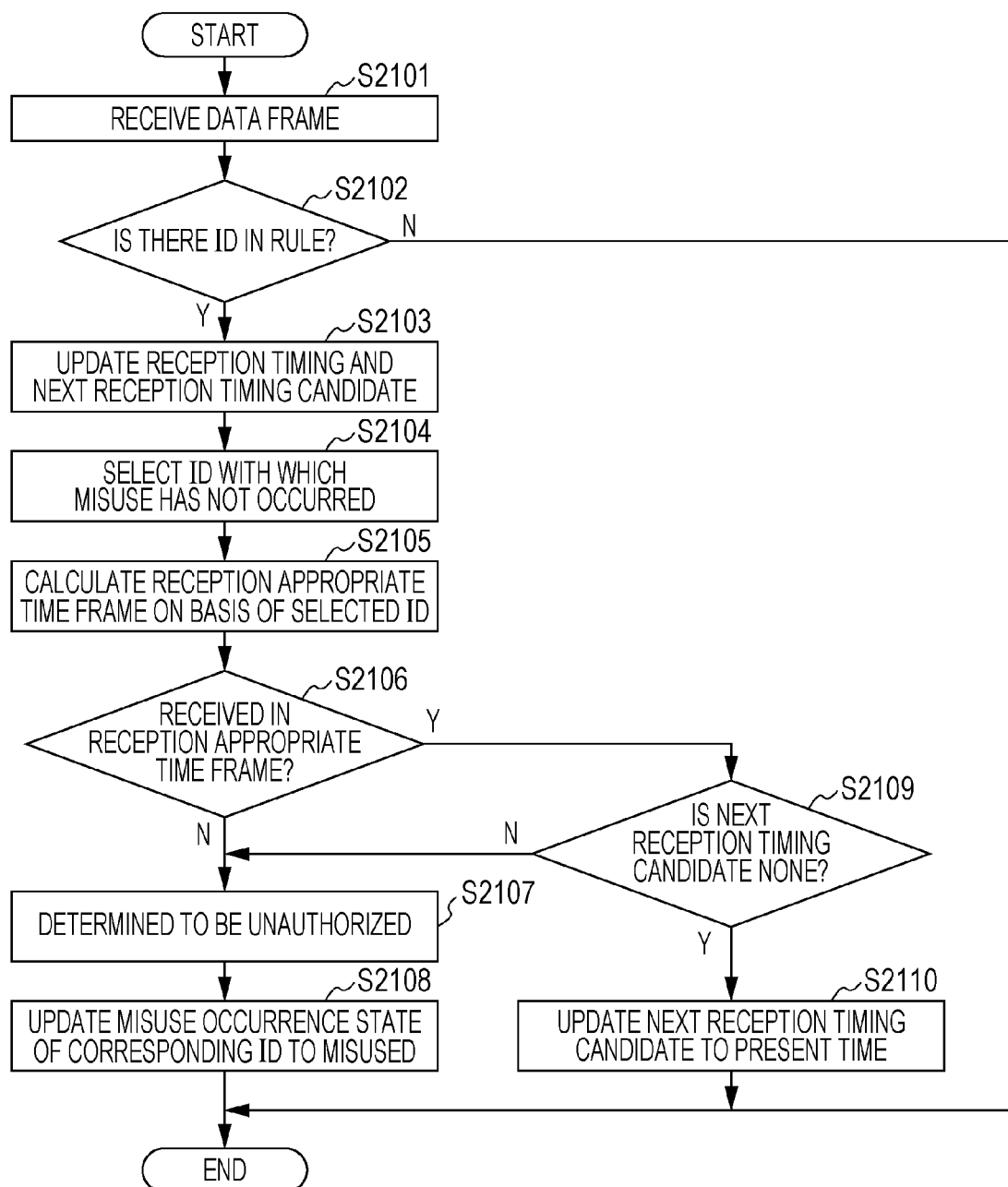
FIG. 18 is a flowchart illustrating a misuse detection process performed by the misuse detection ECU when a data frame is received according to the second embodiment.

(22) An aspect of the present disclosure, for example, may be a misuse detection method including the entirety or a part of the misuse detection process illustrated in FIG. 10 or 18 or the like. In addition, an aspect of the present disclosure may be a computer program that achieves this method using a computer, or may be a digital signal configured by the computer program. In addition, an aspect of the present disclosure may be the computer program or the digital signal recorded in a computer-readable recording medium such as a flexible disk, a hard disk, a CD-ROM, a magneto-optical (MO) disk, a digital versatile disc (DVD), a DVD-ROM, a DVD-RAM, a Blu-ray Disc (BD; registered trademark), or a semiconductor memory. In addition, an aspect of the present disclosure may be the computer program or the digital signal transmitted through an electrical communication line, a wireless or wired communication line, a network typified by the Internet, datacasting or the like. In addition, an aspect of the present disclosure is a computer system including a microprocessor and a memory. The computer program may be recorded in the memory, and the microprocessor may operate in accordance with the computer program. In addition, the present disclosure may be implemented by another independent computer system by recording the program or the digital signal in one of the recording media and transporting the recording medium or by transporting the program or the digital signal through the network or the like.

(23) An aspect of the present disclosure may be, for example, a misuse detection system including some or all of the functions of one of the above-described misuse detection ECUs. The misuse detection system can be configured, for example, by an ECU connected to buses (may be a misuse detection ECU or another ECU), a device that can communicate with the ECU (e.g., a server apparatus located outside a vehicle or the like), and the like.

(24) The scope of the present disclosure also includes modes achieved by arbitrarily combining the components and the functions described in the above embodiments and modifications.

The present disclosure can be used for appropriately detecting transmission of an unauthorized frame to buses in a vehicle network according to a CAN.

What is claimed is:

1. A misuse detection method used in a misuse detection electronic unit in a vehicle network system, the vehicle network system including a plurality of electronic control units that communicate with one another through networks, the misuse detection method comprising:
receiving a target data frame at one time point, the target data frame being transmitted through the networks and has a first identifier;
receiving a reference data frame at another time point different than the one time point, the reference data frame being transmitted through the networks and has a second identifier different from the first identifier;
performing, as misuse detection for the target data frame based on a certain rule specifying a reception interval between the one time point at which the target data frame is received and the other time point at which the reference data frame is received; and
determining the target data frame received is for misuse based on a length of the reception interval,
wherein the target data frame received is determined to be for misuse when the length of the reception interval is shorter than a length of a predetermined first reception interval or longer than a length of a predetermined second reception interval,
wherein the target data frame received is determined to be for legitimate use when the length of the reception interval falls between the length of the predetermined first reception interval and the length of the predetermined second reception interval, and
wherein each of the reception interval, the predetermined first reception interval and the predetermined second reception interval shares a common starting time point.

2. The misuse detection method according to claim 1,
wherein, in the performing of the misuse detection for the target data frame, if a relationship between a reception timing of the target data frame and a reception timing of the reference data frame complies with the certain rule, it is evaluated that the target data frame is not unauthorized, and if the relationship does not comply with the certain rule, it is evaluated that the target data frame is unauthorized.

3. The misuse detection method according to claim 1,
wherein the certain rule specifies an appropriate range of the length of the reception interval, and
wherein, in the performing of the misuse detection for the target data frame, if a difference between a reception timing of the target data frame and a reception timing of the reference data frame prior to the foregoing reception timing falls within the appropriate range, it is evaluated that the certain rule is complied with.

4. The misuse detection method according to claim 1, further comprising:
evaluating, as misuse detection for the target data frame, whether the target data frame is unauthorized in accordance with an interval between a reception timing of the target data frame and a reception timing of a target data frame prior to the foregoing reception timing,
wherein the misuse detection in the evaluating is performed prior to the misuse detection for the target data frame in the performing and after it is evaluated in the evaluating that the target data frame is unauthorized, the misuse detection in the evaluating is stopped and the misuse detection for the target data frame in the performing starts.

5. The misuse detection method according to claim 4,
wherein, in the evaluating, if the reception timing of the target data frame falls outside an appropriate time frame predetermined based on the reception timing of the target data frame prior to the foregoing reception timing, or if the reception timing of the target data frame falls within the appropriate time frame and another target data is received at a timing within the appropriate time frame, it is evaluated as the misuse detection for the target data frame that the target data frame is unauthorized.

6. The misuse detection method according to claim 1, further comprising:
receiving another reference data frame transmitted through the networks,
wherein, the other reference data frame is a data frame having a third identifier different from the first identifier or the second identifier,
the misuse detection method further comprises:
performing misuse detection for the reference data frame; and
subsequently performing, as misuse detection for the target data frame, evaluation in accordance with a reception timing of the other reference data frame and a reception timing of the target data frame based on a rule specifying a reception interval between the other reference data frame and the target data frame,
wherein, if it is detected in the performing of the misuse detection for the reference data frame that the reference data frame is unauthorized, the misuse detection in the performing for the target data frame is stopped and the misuse detection in the subsequently performing starts.

7. The misuse detection method according to claim 6,
wherein the misuse detection in the performing for the target data frame starts after one of a plurality of identifiers different from the first identifier selected in accordance with a predetermined selection criterion is determined as the second identifier, and the misuse detection in the subsequently performing starts after one of a plurality of identifiers different from the first identifier or the second identifier selected in accordance with the predetermined selection criterion is determined as the third identifier.

8. The misuse detection method according to claim 1,
wherein the misuse detection for the target data frame in the performing is performed after one of a plurality of identifiers different from the first identifier, the one of the plurality of identifiers being an identifier of a data frame with which misuse has not yet been detected, is determined as the second identifier.

9. The misuse detection method according to claim 1,
wherein the misuse detection for the target data frame in the performing is performed after one of a plurality of identifiers different from the first identifier is determined as the second identifier in accordance with a state of a vehicle on which the plurality of electronic control units are mounted.

10. The misuse detection method according to claim 1,
wherein, in the misuse detection for the target data frame in the performing, a determination of whether the target data frame is unauthorized is performed in accordance with a reception timing of each of at least one data frame each having an identifier different from the first identifier or the second identifier and the reference data frame and a reception timing of the target data frame based on a group of rules including the certain rule specifying a reception interval between each of the at least one data frame and the reference data frame and the target data frame, and whether the target data frame is unauthorized is determined based on a result of the evaluation.

11. The misuse detection method according to claim 1,
wherein, in the misuse detection for the target data frame in the performing, the misuse detection is performed by calculating a likelihood that the target data frame is unauthorized through a certain calculation based on a group of rules including the certain rule specifying a reception interval between each of at least one data frame each having an identifier different from the first identifier or the second identifier and the reference data frame and the target data frame, a reception timing of each of the at least one data frame and the reference data frame, and the reception timing of the target data frame.

12. The misuse detection method according to claim 1, further comprising:
recording a result of the misuse detection for the target data frame performed in the performing in a storage medium.

13. The misuse detection method according to claim 1,
wherein the reference data frame is received prior to receiving the target data frame.

14. A misuse detection electronic control unit in a vehicle network system, the vehicle network system including a plurality of electronic control units that communicate with one another through networks, the misuse detection electronic control unit comprising:
a processor; and
a memory including at least one set of instructions that, when executed by the processor, causes the processor to perform operations including:
receiving a target data frame at one time point, the target data frame being transmitted through the networks and has a first identifier, and a reference data frame at another time point different than the one time point, the reference data frame being transmitted through the networks and has a second identifier different from the first identifier;

holding rule information indicating a certain rule specifying a reception interval between the target data frame and the reference data frame; and detecting, as misuse detection for the target data frame based on a certain rule specifying a reception interval between the one time point at which the target data frame is received and the other time point at which the reference data frame is received; and determining that the data frame received is for misuse based on a length of the reception interval, wherein the target data frame received is determined to be for misuse when the length of the reception interval is shorter than a length of a predetermined first reception interval or longer than a length of a predetermined second reception interval, wherein the target data frame received is determined to be for legitimate use when the length of the reception interval falls between the length of the predetermined first reception interval and the length of the predetermined second reception interval, and wherein each of the reception interval, the predetermined first reception interval and the predetermined second reception interval shares a common starting time point.

15. A misuse detection system for misuse detection in a vehicle network system, the vehicle network system including a plurality of electronic control units that communicate with one another through networks, the misuse detection system comprising:

a processor; and a memory including at least one set of instructions that, when executed by the processor, causes the processor to perform operations including:

receiving a target data frame at one time point, and a reference data frame at another time point different than the one time point, the target data frame is transmitted through the networks and has a first identifier, and the reference data frame is transmitted through the networks and has a second identifier different from the first identifier;

holding rule information indicating a certain rule specifying a reception interval between the target data frame and the reference data frame; and detecting, as misuse detection for the target data frame based on a certain rule specifying a reception interval between the one time point at which the target data frame is received and the other time point at which the reference data frame is received, and determining that the target data frame received is for misuse based on a length of the reception interval, wherein the target data frame received is determined to be for misuse when the length of the reception interval is shorter than a length of a predetermined first reception interval or longer than a length of a predetermined second reception interval, wherein the target data frame received is determined to be for legitimate use when the length of the reception interval falls between the length of the predetermined first reception interval and the length of the predetermined second reception interval, and wherein each of the reception interval, the predetermined first reception interval and the predetermined second reception interval shares a common starting time point.

* * * * *